United States Patent

Xu

(10) Patent No.: US 8,705,663 B2
(45) Date of Patent: Apr. 22, 2014

(54) RECEIVER ARCHITECTURE AND METHODS FOR DEMODULATING BINARY PHASE SHIFT KEYING SIGNALS

(71) Applicant: Innophase Inc., Chicago, IL (US)

(72) Inventor: Yang Xu, Chicago, IL (US)

(73) Assignee: Innophase Inc., Chicago, IL (US)

( * ) Notice: Subject to any disclaimer, the term of this patent is extended or adjusted under 35 U.S.C. 154(b) by 0 days.

(21) Appl. No.: 14/034,426

(22) Filed: Sep. 23, 2013

(65) Prior Publication Data

US 2014/0023163 A1  Jan. 23, 2014

Related U.S. Application Data

(63) Continuation of application No. 13/754,819, filed on Jan. 30, 2013, now Pat. No. 8,542,779.

(60) Provisional application No. 61/593,221, filed on Jan. 31, 2012, provisional application No. 61/615,169, filed on Mar. 23, 2012.

(51) Int. Cl.
*H03D 3/18* (2006.01)
*H03D 3/24* (2006.01)

(52) U.S. Cl.
USPC ........... 375/327; 375/329; 375/332; 375/226; 331/2

(58) Field of Classification Search
USPC ............... 375/324, 327–333, 371–376, 226; 327/147, 156; 331/2; 329/306–307
See application file for complete search history.

(56) References Cited

U.S. PATENT DOCUMENTS

| | | | |
|---|---|---|---|
| 6,317,008 B1 | 11/2001 | Gabara | |
| 6,369,659 B1 | 4/2002 | Delzer et al. | |
| 6,556,636 B1 | 4/2003 | Takagi | |
| 6,975,165 B2 | 12/2005 | Lopez Villegas et al. | |
| 7,095,274 B2 | 8/2006 | Lopez Villegas et al. | |
| 7,262,670 B2 * | 8/2007 | Rohde et al. | 331/117 R |
| 7,564,929 B2 | 7/2009 | Lopez Villegas et al. | |
| 2006/0023809 A1 | 2/2006 | Lopez Villegas et al. | |
| 2010/0085123 A1* | 4/2010 | Frans et al. | 331/47 |
| 2010/0134158 A1 | 6/2010 | Pignol et al. | |

OTHER PUBLICATIONS

J.M. Lopez-Villegas, et al., BPSK to ASK Converter for RF Digital Communications, IEEE Radio Frequency Integrated Circuits Symposium, Jun. 2003, pp. 643-646.
Qiang Zhu, et al., A 228 µW 750 MHz BPSK Demodulator Based on Injection Locking, IEEE Journal of Solid-State Circuits, Feb. 2011, vol. 46, No. 2, pp. 416-423.

(Continued)

*Primary Examiner* — Curtis Odom
(74) *Attorney, Agent, or Firm* — Robert J. Irvine, III

(57) ABSTRACT

A receiver is described. The receiver includes a first injection-locked oscillator having a first input configured to receive a BPSK signal and a second input configured to receive a first frequency reference. The receiver also includes a second injection-locked oscillator having a third input configured to receive the BPSK signal and a fourth input configured to receive a second frequency reference. Further, the receiver includes a first phase-locked loop coupled with the second input of the first injection-locked oscillator. The first phase-locked loop is configured to generate the first frequency reference. And, a second phase-locked loop is coupled with the fourth input of the second injection-locked oscillator. The second phase-locked loop is configured to generate the second frequency reference.

20 Claims, 13 Drawing Sheets

(56) References Cited

OTHER PUBLICATIONS

Behzad Razavi, A Study of Injection Pulling and Locking in Oscillators, Electrical Engineering Department, University of California, 2003, IEEE, Custom Integrated Circuits Conference.

Marc Tiebout, A 50GHz Direct Injection Locked Oscillator Topology as Low Power Frequency Divider in 0.13 μm CMOS, Infineon Technologies AG, Solid-State Circuits Conference, 2003, pp. 73-76, 29th European ESSCIRC.

Chi-Tsan Chen, Cognitive Polar Receiver Using Two Injection-Locked Oscillator Stages, IEEE Transactions on Microwave Theory and Techniques, Dec. 2011, vol. 59, No. 12, pp. 3484-3493.

N. Siripon, et al., Novel Sub-Harmonic Injection-Locked Balanced Oscillator, Microwave and Systems Research Group (MSRG), School of Electronics, Computing and Mathematics, University of Surrey, Sep. 24, 2011, 31st European Microwave Conference.

Hamid R. Rategh, et al., Superharmonic Injection Locked Oscillators as Low Power Frequency Dividers, Stanford University, Stanford, California.

Pei-Kang Tsai, et al., Wideband Injection-Locked Divide-by-3 Frequency Divider Design with Regenerative Second-Harmonic Feedback Technique, RF@CAD Laboratory, Department of Electrical Engineering, National Cheng Kung University, Tainan, Taiwan.

Lopez-Villegas et al., BPSK to ASK Signal Conversion Using Injection-Locked Oscillators—Part I: Theory, IEEE Transactions on Microwave Theory and Techniques, Dec. 2005, pp. 3757-3766, vol. 53, No. 12.

International Search Report for PCT/US2013/24159 mailed Apr. 9, 2013.

* cited by examiner

RECEIVER ARCHITECTURE AND METHODS FOR DEMODULATING BINARY PHASE SHIFT KEYING SIGNALS

CROSS-REFERENCE TO RELATED APPLICATIONS

This application claims priority under 35 USC §120 as a continuation application of U.S. application Ser. No. 13/754,819, filed Jan. 30, 2013, entitled "Receiver Architecture and Methods for Demodulating Binary Phase Shift Keying Signals", which is a non-provisional application claiming priority under 35 USC §119 to U.S. Provisional Patent Application No. 61/593,221, filed on Jan. 31, 2012, entitled "Receiver Architecture and Methods for Binary and Quadrature Phase Shift Keying Signals" and U.S. Provisional Patent Application No. 61/615,169, filed on Mar. 23, 2012, entitled, "Receiver and Transmitter Architecture and Methods for Binary and Quadrature Phase Shift Keying Signals" now expired, all of which are hereby incorporated by reference in their entirety.

TECHNICAL FIELD

Embodiments of the present disclosure relate generally to communication systems and methods, and in particular to a receiver architecture and methods for receiving Binary Phase Shift Keying ("BPSK") signals and optionally Quadrature Phase Shift Keying ("QPSK") signals.

BACKGROUND

Recent advances in high speed integrated circuit technologies enable various innovative and versatile applications through an ultra-low-power wireless link such as mesh sensor network, a remote industrial monitoring and an implantable medical device. For the wireless data access, the modulation scheme adapted is critical to the link qualities in terms of bit rate and bit error rate.

Phase shift keying ("PSK"), specifically binary phase shift keying ("BPSK") and quadrature phase shift keying ("QPSK"), is a widely used digital modulation scheme in wireless systems such as IEEE 802.15.4, global positioning system ("GPS"), IEEE 802.11 ("WiFi") systems and medical telemetry. This technique represents digital bits by shifting the phase of the carrier signals. Under similar bandwidth occupation, PSK signals are more robust to noise as compared to amplitude shift keying ("ASK") or frequency shift keying ("FSK") modulation schemes.

Demodulation of a PSK signal usually requires coherent detection and synchronization which is accomplished by a carrier recovery circuit such as a COSTAS loop. Due to its complexity, however, the room for power consumption reduction of COSTAS loop is limited. This has become a roadblock to further advancements. Accordingly, major developments are needed and would be of significant benefit.

BRIEF SUMMARY

A receiver is described. The receiver includes a first injection-locked oscillator having a first input configured to receive a BPSK signal and a second input configured to receive a first frequency reference. The receiver also includes a second injection-locked oscillator having a third input configured to receive the BPSK signal and a fourth input configured to receive a second frequency reference. Further, the receiver includes a first phase-locked loop coupled with the second input of the first injection-locked oscillator. The first phase-locked loop is configured to generate the first frequency reference. And, a second phase-locked loop is coupled with the fourth input of the second injection-locked oscillator. The second phase-locked loop is configured to generate the second frequency reference.

Other features and advantages of embodiments of the present invention will be apparent from the accompanying drawings and from the detailed description that follows.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein.

In the drawings, where like reference numerals refer to like reference in the specification.

DETAILED DESCRIPTION

Those of ordinary skill in the art will understand that the following detailed description is illustrative only and is not intended to be in any way limiting. Other embodiments of the present inventions may suggest themselves to such skilled persons having the benefit of this disclosure and the teachings provided herein. Reference will now be made in detail to exemplary implementations of the present inventions as illustrated in the accompanying drawings.

In the interest of clarity, not all of the routine features of the exemplary implementations described herein are shown and described. It will of course be appreciated that in the development of any such actual implementation, numerous implementation-specific decisions must be made in order to achieve the specific goals of the developer, such as compliance with regulatory, safety, social, environmental, health, and business-related constraints, and that these specific goals will vary from one implementation to another and from one developer to another.

Embodiments of the present disclosure relate generally to communication systems and methods, such as but not limited to wireless and optical communications systems, and in particular to receiver architecture and methods for receiving Binary Phase Shift Keying ("BPSK") signals and optionally Quadrature Phase Shift Keying ("QPSK") signals.

Figure 1:
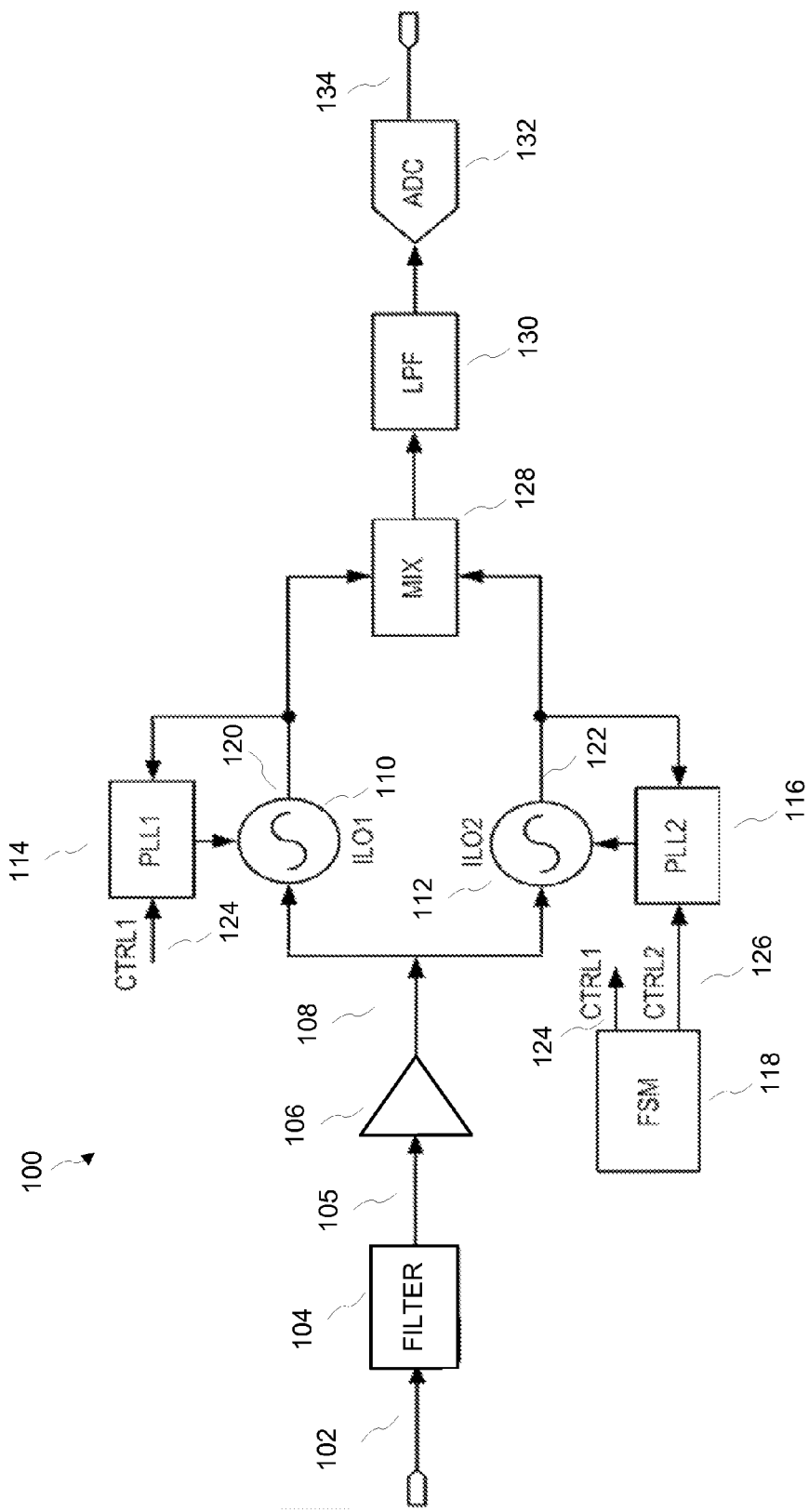
FIG. 1 illustrates a circuit block diagram of a receiver architecture including phase-locked loops according to an embodiment.

Referring to the figures, FIG. 1 illustrates a circuit block diagram of a receiver architecture 100 for use in a receiver according to an embodiment. According to the embodiment illustrated in FIG. 1, a filter 104 is configured to receive a BPSK signal 102 having a carrier frequency (fc). For an embodiment, a carrier frequency may be a frequency in a range including 800 megahertz ("MHz") up to and including 6 gigahertz ("GHz"). One skilled in the art would understand that a BPSK signal could be used having other frequencies using techniques known in the art. For an embodiment, a BPSK signal 102 may be from an antenna and/or circuitry including, but not limited to, one or more components known in the art to receive, amplify, shape, or otherwise receive a signal propagating through a medium including, but not limited to, a conductor, air, and glass such as a fiber optic cable. Filter 104 may be a band-pass filter, a low-pass filter, high-pass filter or a combination thereof. According to an embodiment, a filter 104 may be implemented using one or more of discrete components such as resistors, capacitors, and inductors; active components such as transistors and operation amplifiers; a digital signal processor; a field-programmable gate array ("FPGA"); an application-specific integrated circuit ("ASIC"); and other circuits to filter a signal. A filter 104 is configured to have a bandwidth to select the frequency range of the signal desired and to minimize noise or parts of the signal that are not desired using techniques including those known in the art.

A BPSK signal 102, for an embodiment, is filtered by a filter 104 configured as a band-pass filter ("BPF") which selects the signal band centered at a carrier frequency (fc). For an embodiment, a filter 104 is configured to select a signal band centered at a carrier frequency by reducing the amplitude of a signal at frequencies outside the signal band, removing frequencies of a signal, canceling frequencies or a part of a signal, or using other techniques such as those know in the art to select a signal band centered at a carrier frequency. A filter 104 is configured to generate a filtered BPSK signal 105. According to the embodiment illustrated in FIG. 1, filter 104 is coupled with an amplifier 106. An amplifier 106 includes, but is not limited to, one or more of components used to increase the amplitude of a signal as is known in the art. Components include, but are not limited to, one or more of a transistor, a resistor, a capacitor, an inductor, an operational amplifier, an integrated circuit or other device used to shape or process a signal. The amplifier is configured to have a gain. For some embodiments, the gain of the amplifier is set to a value so the amplifier generates an amplified output signal within a range to ensure proper operation of a next stage in the receiver architecture 100. The amplifier 106, according to some embodiments, is configured to have a variable gain using techniques such as those known in the art. The gain of the amplifier 106 may be based on one or more of a BPSK signal 102, a filtered BPSK signal 105, an amplified BPSK signal 108, and other signals using techniques known in the art. Some embodiments include an amplifier 106 that includes one or more stages of amplification using techniques such as those known in the art.

According to the embodiment illustrated in FIG. 1, a BPSK signal 102 is amplified by an amplifier 106 configured as a low noise amplifier ("LNA"). An LNA, for an embodiment, is configured to minimize the introduction of noise in to the signal path. For an embodiment, the LNA is configured to have a noise figure in a range including 1 decibels ("dB") up to and including 5 dB. For an embodiment, an amplifier 106 includes an LNA as one of multiple stages of amplification. According to the embodiment illustrated in FIG. 1, amplifier 106 is coupled with two injection-locked oscillators ("ILO"), a first injection-locked oscillator ("ILO1") 110 and a second injection-locked oscillator ("ILO2") 112. The two injection-locked oscillators (ILOs) are used to transform a BPSK signal to an ASK signal. According to some embodiments, an amplifier 106 may be coupled with an ILO1 110 and an IL02 112 through a power divider such as those known in the art.

For another embodiment, an amplifier 106 is a differential amplifier having a pair of differential inputs and a pair of differential outputs using techniques known in the art. For such an embodiment, a positive output of an amplifier 106 configured as a differential amplifier is coupled with an ILO1 110 and a negative output of the amplifier 106 is coupled with an IL02 112 without the use of a power divider. Alternatively, a positive output of an amplifier 106 configured as a differential amplifier is coupled with IL02 112 and a negative output of the amplifier 106 is coupled with ILO1 110. For an embodiment, amplifier 106 is alternate-current ("AC") coupled with an ILO1 110 through a capacitor. Similarly, amplifier 106 is AC coupled with an IL02 112 through a capacitor according to an embodiment.

In some embodiments, the BPSK demodulator employs two second harmonic ILOs. The ILOs can be implemented as ring oscillators, RC oscillators and/or LC oscillators. The ILO oscillates at a free fun frequency when there is no injection. The ILO locks to harmonics or sub-harmonics of the injected signal when there is a sufficient injection power. A second harmonic ILO locks to half the frequency of the injected signal. At fixed injection power, the injection frequency has to be in the locking range so the ILO locks. The amplified BPSK signal 108 at a carrier frequency of fc, according to an embodiment, is fed to two ILOs each one of the two ILOs controlled by a phase-locked loop ("PLL"). According to an embodiment, a PLL may be implemented as an analog phase-locked loop, a digital phase-locked loop, or any other type of a phase locked loop. For an embodiment, a first phase-locked loop ("PLL1") 114 is coupled with an IL01 110 and a second phase-locked loop ("PLL2") 116 is coupled with an IL02 112. According to an embodiment, the two PLLs are configured to set an initial frequency of ILO1 at $fc/2+\Delta f$ and an initial frequency of IL02 at $fc/2-\Delta f$. For an embodiment, a frequency offset, $\Delta f$, is set based on a data rate and other receiver specifications. For an embodiment, a $\Delta f$, may be in a range including $\frac{1}{2}$ up to and including $\frac{1}{8}$ of a data rate of a BPSK signal 102. By way of example and not limitation, a receiver is configured to receive a BPSK signal having a data rate of 16 megabits per second ("Mbps") with a $\Delta f$ in a range including 2 MHz up to and including 8 MHz. One skilled in the art would understand that a frequency offset, $\Delta f$, may be set at other values to achieve a desired performance of a receiver. According to an embodiment, an amplified BPSK signal 108 having a carrier frequency of fc received by IL01 110 and IL02 112 will cause IL01 110 and IL02 112 to re-lock from their initial frequencies as set by their respective PLLs to a frequency of fc/2.

According to an embodiment such as the one illustrated in FIG. 1, PLL1 114 is coupled with the ILO1 output 120 and PLL2 116 is coupled with an IL02 output 122. PLL1 114 is configured to use an ILO1 output 120 as part of a feedback loop to adjust the operation of the PLL1 114 based on the ILO1 output 120 received. PLL2 116 is configured to use a signal received on an IL02 output 122 as part of a feedback loop to adjust the operation of the PLL2 116 based on the IL02 output 122. The use of the ILO1 output 120 in a feedback loop results in PLL1 114 and ILO1 110 operating as a closed-loop control system such that, for an embodiment, ILO1 110 maintains a more accurate channel selection and rejects interference caused by an adjacent channel. The use of the IL02 output 122 in a feedback loop also results in PLL2 116 and IL02 110 operating as a closed-loop control system such that, for an embodiment, IL02 112 maintains a more accurate channel selection and rejects interference caused by an adjacent channel. The use of a feedback loop and a PLL or FLL with an ILO overcomes inaccuracies in frequency selection present in systems using a free running ILO. Such inaccuracies can degrade the performance of a receiver which results in bit errors. Operating an ILO in a closed-loop control system mitigates non-ideal effects including, but not limited to fluctuations in power supply voltage, thermal profile changes, and noise or interference introduced to a receiver.

For an embodiment, a finite state machine ("FSM") 118 is configured to select a sequence of various controlling stages, or an operating mode from a plurality of operating modes. According to an embodiment, an FSM 118 is configured to control a PLL1 114 to set an initial frequency of an ILO1 110 and a PLL2 116 to set an initial frequency of an IL02 112. Once an ILO is locked on an input signal, a PLL, according to an embodiment, will be configured to run with a greater tuning time constant. For an embodiment, a PLL is configured to have a tuning constant of in a range including one up to and including three orders of magnitude times the tuning constant before an ILO is locked.

According to an embodiment, a FSM 118 is configured to adjust a tuning constant of a PLL based on a locked state of an ILO. An FSM 118, according to an embodiment, is coupled with a PLL1 114 and a PLL2 116 through one or more control lines. For an embodiment, an FSM 118 is coupled with a PLL1 114 through a first control line 124 and a PLL2 116 through a second control line 126. An FSM 118, according to an embodiment, a control line, such as a first control line 124 and a second control line 126, is configured to transmit one or more control signals to one or both PLL1 114 or PLL2 116. A control signal may cause a PLL to turn on, turn off, increase frequency, decrease frequency, or otherwise change an operation of a PLL or one or more components thereof. A control signal includes, but is not limited to, a voltage signal, a current signal, an optical signal, or any other way to control an operation of a component or device. For an embodiment, an FSM 118 may be coupled with one or more PLLs by a plurality of control lines including, but not limited to, a parallel bus and a serial bus. An FSM 118 may be implemented using one or more of a logic gate, a relay, a flip flop, a programmable logic device, a programmable logic controller, a microcontroller, microprocessor, an ASIC, or any other device and/or software to perform actions based on a state of a system and/or a transition between states of a system.

As illustrated in FIG. 1, an embodiment includes an ILO1 110 and an IL02 112 coupled with a mixer 128. A mixer 128 is configured to receive an ILO1 output 120 and an IL02 output 122 to mix the outputs (e.g. adding, subtracting, multiplying) to produce a signal based on the phase changes of a BPSK signal 102. For an embodiment a mixer ("MIX") 128 may be implemented as a single-ended mixer, a balanced mixer, double-balanced mixer, or other circuit used to combine signals together. For an embodiment, a mixer 128 is coupled with a low pass filter 130. A low-pass filter ("LPF") 130, according to an embodiment, is may be implemented using techniques including those described herein for implementing a filter. For an embodiment, a LPF 130 is configured to have a cut-off frequency based on the data rate of the input BPSK signal 102. For an embodiment the cut-off frequency of a LPF 130 is configured to filter away adjacent channel interference while maintain as much in-band signal as possible. For an embodiment, a LPF 130 is coupled with an analog-to-digital converter ("ADC") 132. An ADC 132 is configured to sample the signal received from a LPF 130 to generate a bit sequence or baseband signal based on a BPSK signal 102. For an embodiment, an output signal 134 of an ADC 132 is a demodulated bit sequence carried by a BPSK signal 102. According to an embodiment, an output signal 134 of the ADC 132 may be further processed for decoding and/or conditioning using techniques known in the art for processing digital data.

Figure 2:
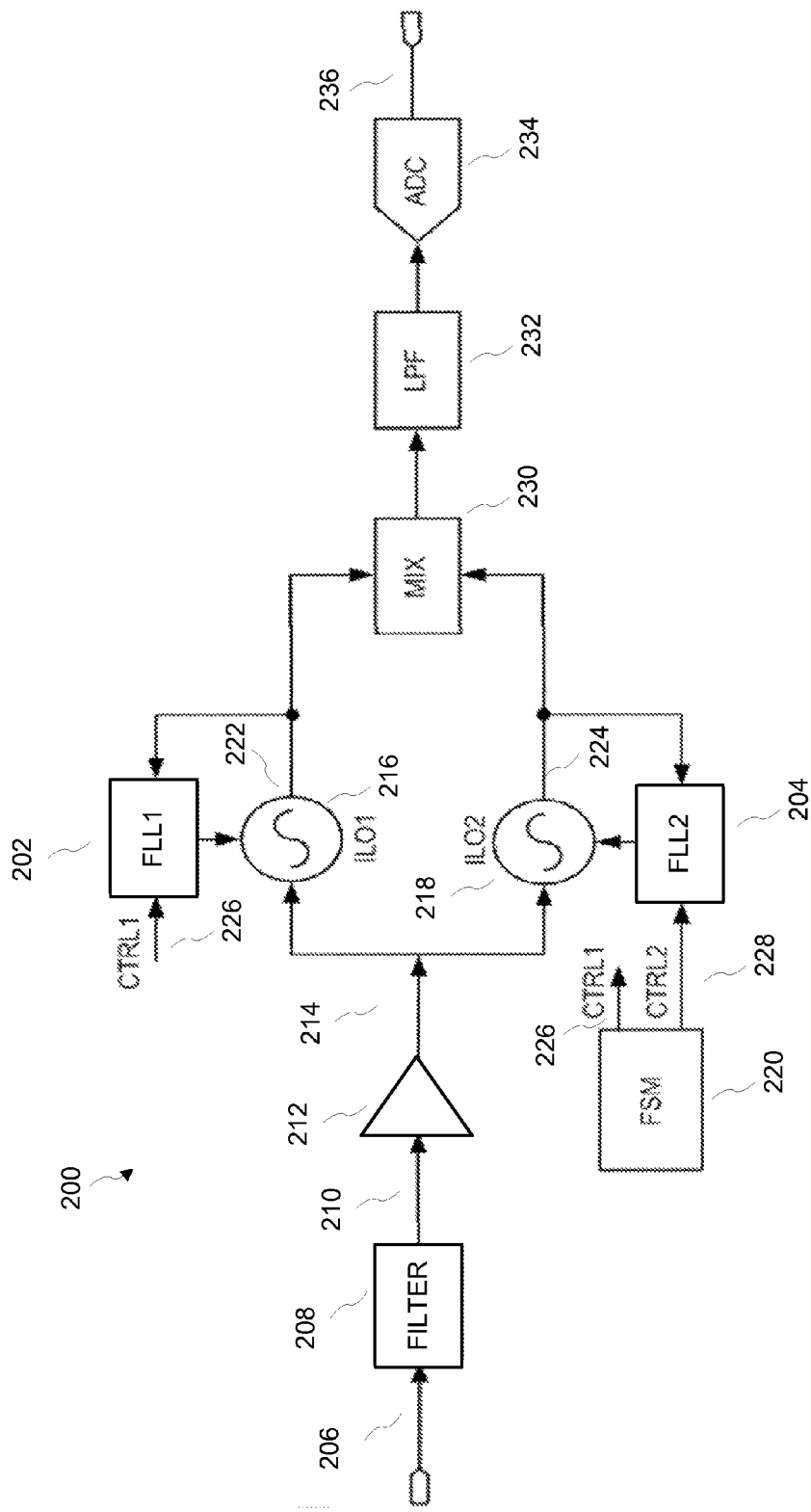
FIG. 2 illustrates a circuit block diagram of a receiver architecture including frequency-locked loops according to an embodiment.

FIG. 2 illustrates a circuit block diagram of a receiver architecture 200 including frequency-locked loops ("FLL") for use in a receiver according to an embodiment. For the embodiment illustrated in FIG. 2, FLLs are used as an ILO control circuit instead of PLLs as described above with reference to FIG. 1. According to the embodiment illustrated in FIG. 2, FLL1 202 is coupled with ILO1 216 and PLL2 204 is coupled with IL02 218. For an embodiment, FLL1 202 and FLL2 204 are configured to set an initial frequency of an ILO1 216 at fc/2+$\Delta$f and an IL02 218 at fc/2−$\Delta$f without phase alignment as in a PLL control case such as the embodiment illustrated in FIG. 1. As described above with regard to ILO1 110 and IL02 112 in the embodiment illustrated in FIG. 1, an ILO1 216 and IL02 218 are configured to receive an amplified BPSK signal 214 having a carrier frequency of fc which will cause ILO1 216 and IL02 218 to re-lock from their initial frequencies as set by their respective FLLs to a frequency of fc/2.

The rest of the embodiment of the receiver architecture 200 illustrated in FIG. 2 is similar to receiver architecture 100 as described above. Specifically, an embodiment of a receiver architecture 200 as illustrated in FIG. 2 includes a filter 208 configured to receive an BPSK signal 206 using techniques described herein. A filter 208 is configured to generate a filtered BPSK signal 210 using techniques such as those described herein. A filter 208 is coupled with an amplifier 212. For an embodiment, amplifier 212 is configured according to techniques described above. For an embodiment, FLL1 202 is coupled with an ILO1 output 222 and FLL2 204 is coupled with an IL02 output 224. ILO1 output 222 and IL02 output 224 are used as part of a feedback loop for FFL1 202 and FFL2 204, respectively using techniques including those described herein. For an embodiment, an FSM 220 and a first control signal ("CTRL1") 226 and a second control signal ("CTRL2") 228 may be implemented using techniques including those described herein. According to the embodiment illustrated in FIG. 2, receiver architecture 200 includes a mixer 230 coupled with ILO1 216 and IL02 218. A mixer 230 may be configured and implemented using techniques including those described herein. For an embodiment, mixer 230 is coupled with a LPF 232. A LPF 232 may be implemented using techniques including those described herein. As further illustrated in FIG. 2, an embodiment includes a LPF 232 coupled with an ADC 234. For an embodiment, a LPF 232 may be coupled with an ADC 234 using techniques including those described herein. An ADC 234, according to an embodiment, may be implemented using techniques including those described herein to generate an output signal 236 including, but not limited to, a bit sequence or a baseband signal based on an BPSK signal 206.

Figure 3:
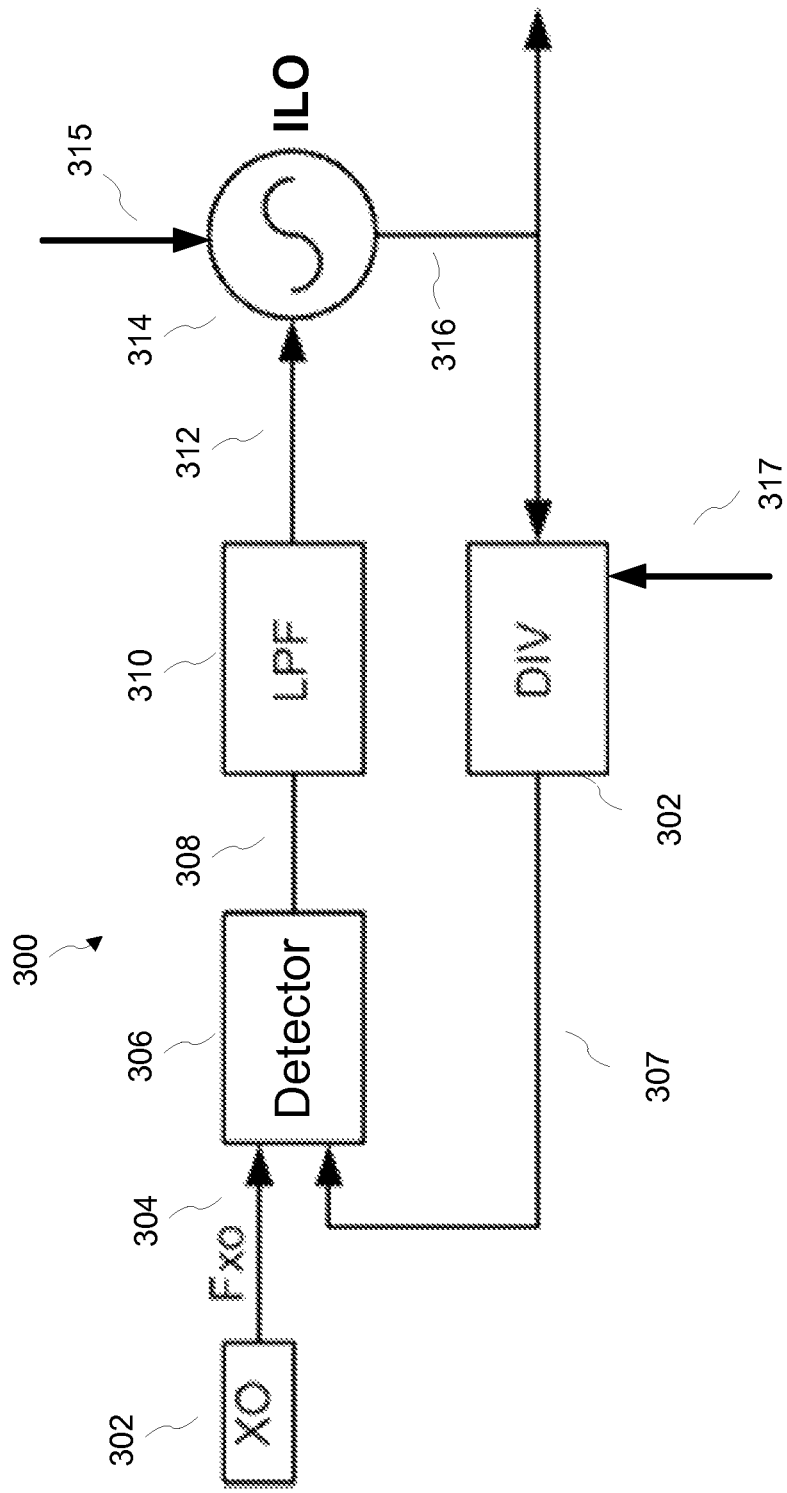
FIG. 3 illustrates a circuit block diagram of an injection-locked loop control circuit according to an embodiment.

FIG. 3 is a block diagram of an ILO control circuit 300 such as a PLL or FLL illustrating components of a phase-locked loop according to an embodiment. A crystal oscillator ("XO") 302 provides a reference frequency signal 304 at frequency of $F_{XO}$. According to an embodiment, an XO 302 may be configured to have a frequency from 1 megahertz ("MHz") up to 40 MHz. For a specific embodiment, an XO 302 may have a frequency of 20 MHz. One skilled in the art would understand that the frequency of the XO could be any frequency. According to an embodiment, an XO 302 is coupled with a detector 306. For an embodiment, a detector 300 is a phase detector ("PD") such as a phase-frequency detector. A phase detector may include, but is not limited to, a frequency mixer, an analog multiplier, a logic circuit, and other circuits that generate a signal that is based on the difference in phase between to input signals. A phase detector is configured to generate a phase-difference signal 308 that is based on the difference in phase between a reference frequency signal 304 and an ILO output signal 316 using techniques known in the art. For an embodiment that uses a phase-frequency detector a phase difference signal may be based on the phase difference and the frequency difference between an ILO output signal 316 and a reference frequency signal 304. For an embodiment, an ILO control circuit 300 is implemented as an FLL, a detector 306 is a frequency detector. A frequency detector includes, but is not limited to, a frequency counter and other circuits that detect a frequency difference between two signals.

According to the embodiment illustrated in FIG. 3, a detector 306 is coupled with a LPF 310. A LPF 310 may be configured using techniques such as those described herein. For an embodiment, a LPF 310 generates a filter output signal 312. A LPF 310 is coupled with ILO 314. An ILO 314 is configured to receive a filter output signal 312 that is used to set the ILO 314 to an initial oscillating frequency and to maintain an oscillating frequency of the ILO 314. An ILO 314 is also configured to receive signal 315 such as a BPSK signal. For an embodiment, an ILO control circuit 300 is configured to maintain a filter output signal 312 at approximately half of the carrier frequency of signal 315. As described above, an ILO output signal 316, according to an embodiment, is fed to a mixer.

For the embodiment illustrated in FIG. 3, ILO 314 is coupled with a frequency divider ("DIV") 302. A frequency divider 302 is configured to divide the frequency of an ILO output signal 316 down so that the frequency of the ILO output signal 316 and the XO frequency Fxo 304 can be defined by a divide ratio. A frequency divider 302 includes, but is not limited to, a regenerative frequency divider, an injection-locked frequency divider, a counter, an arrangement of flip-flops, and other circuits used to divide a frequency of a signal. For an embodiment, a frequency divider 302 is coupled with a FSM by a control line 317. An FSM according to an embodiment is configured to send a signal over a control line 317 to adjust a divide factor of a frequency divider 302 to change a divide ratio of an ILO control circuit 300. For a particular embodiment, an FSM is configured to set registers in a frequency divider to change a divide factor of a frequency divider 302. For an embodiment, a frequency divider 302 is coupled with a detector 306. The detector 306 is configured to generate a phase difference signal 308 based on an output of the frequency divider 307 and a reference frequency signal 304 as described above. A feedback loop of an ILO control circuit 300 configured as a PLL, according to an embodiment, provides control of phase alignment between an XO and an ILO.

Figure 4:
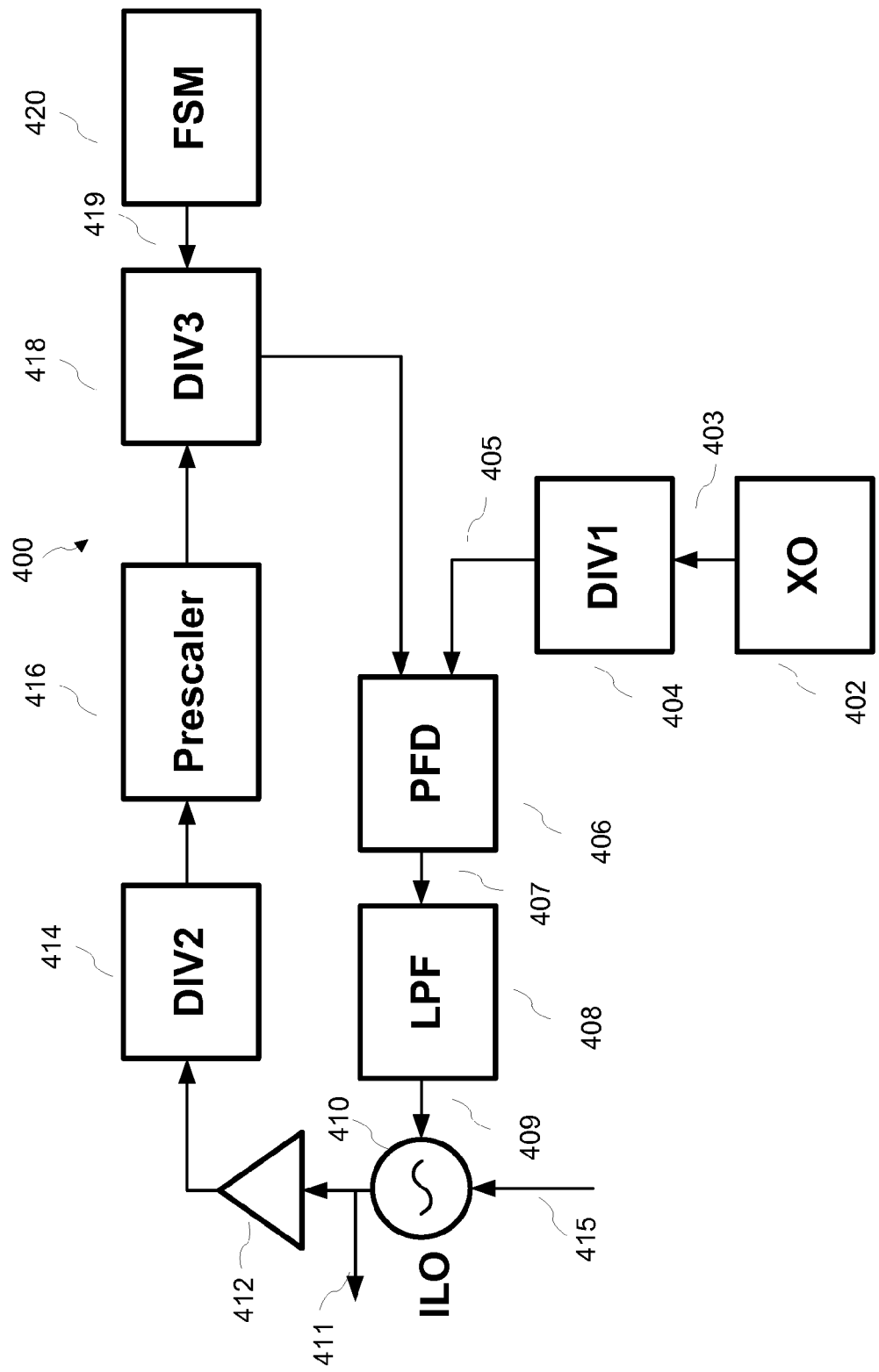
FIG. 4 illustrates a circuit block diagram of an injection-locked loop control circuit that includes multiple frequency dividers according to an embodiment.

FIG. 4 illustrates an embodiment of an ILO control circuit 400 such as a PLL or an FLL that includes multiple frequency dividers. A crystal oscillator ("XO") 402 is coupled with a first reference frequency divider ("DIV1") 404. For an embodiment XO 402 is configured to generate a first reference frequency signal 403. An XO 402 may be configured to generate a first reference frequency signal 403 at a frequency such as described herein. According to an embodiment, a reference frequency divider 404 is configured to reduce the frequency of the XO 402. A first reference frequency divider 404 includes frequency dividers such as those described herein. A first reference frequency divider 404, according to an embodiment, is configured to generate a reference signal 405 based on a first reference frequency signal 403 using techniques such as those described herein. For an embodiment, a first reference frequency divider 404 is configured to generate a first reference signal 403 at a frequency in a range including 10 kilohertz up to 1 MHz. One skilled in the art would understand that a first reference frequency divider 404 may be configured to reduce a frequency of a first reference frequency signal 403 by any divide factor to generate a reference signal 405 at a specific frequency using techniques known in the art.

For the embodiment illustrated in FIG. 4, a first reference frequency divider 404 is coupled with a detector such as a phase-frequency detector 406. A phase-frequency detector ("PFD") 406 is configured to receive a reference signal 405 to compare with a second input signal. As described herein, a PFD 406 is configured to generate a phase-difference signal 407 based on at least a phase difference between a reference signal 405 and a second signal such as a signal based on an output of an ILO 410 using techniques known in the art. A PFD 406 is coupled with a low-pass filter ("LPF") 408. A low-pass filter 408 may be configured using techniques described herein for implementing a filter to generate a filtered reference signal 409. According to the embodiment illustrated in FIG. 4, a LPF 408 is coupled with an ILO 410. An ILO 410 generates an ILO output signal 411 based on a filtered reference signal 409 using techniques including those described herein. An ILO 410, according to an embodiment, is coupled with a buffer or buffer amplifier 412. For an embodiment, a buffer amplifier 412 may include, but is not limited to, a transistor circuit, an operational amplifier circuit, or other buffer circuit. The buffer amplifier 412 is coupled with a second frequency divider ("DIV2") 414. For an embodiment, a second frequency divider 414 is configured to divide the frequency of the buffered ILO output signal by a divide factor of two to generate a signal at half the frequency of the ILO output signal 411 such as by using techniques including those described herein.

According to the embodiment illustrated in FIG. 4, a second frequency divider 414 is coupled to a prescaler 416. A prescaler 416 is configured to divide the output frequency of the second frequency divider 414 by a divide factor. For an embodiment, a divide factor may be in a range including 4 up to and including 5. For another embodiment, a divide factor may be in a range including 8 up to and including 9. One skilled in the art would understand that other divide factors can be used. For an embodiment, a prescaler 416 includes, but is not limited to, an electronic counting circuit configured to reduce the frequency of the input signal using techniques known in the art. A prescaler 416, according to an embodiment, is coupled with a third frequency divider ("DIV3") 418. The third frequency divider 418 is configured to reduce the frequency of the output signal of the prescaler 416. For an embodiment, a third frequency divider 418 is coupled with FSM 420. A third frequency divider 418, according to an embodiment, is configured to receive a control signal 419 from an FSM 420 to adjust a divide factor of the third divider 418 using techniques including those described herein. A third frequency divider 418 may be configured to adjust the divide by factor from 1 up to 300. For an embodiment, FSM 420 may generate a control signal, such as those described herein, that may vary from 0 to 5 volts to adjust the divide by factor of a third frequency divider 418. For an embodiment, a control signal may be a signal that corresponds to logic "0" and "1" to adjust the divide by factor of a third frequency divider 418. According to an embodiment, a third frequency divider 418 is configured to have a divide factor that would cover all the frequency bands a receiver is designed to process. According to the embodiment, illustrated in FIG. 4, a third frequency divider 418 is configured to further divide the frequency of an ILO output signal 411 down to a frequency for input to a phase-frequency detector 406. The phase-frequency detector 406 is configured to generate a phase-difference signal 405 based on a received signal from a third frequency divider 418 and a reference signal 405, as described herein.

Figure 5:
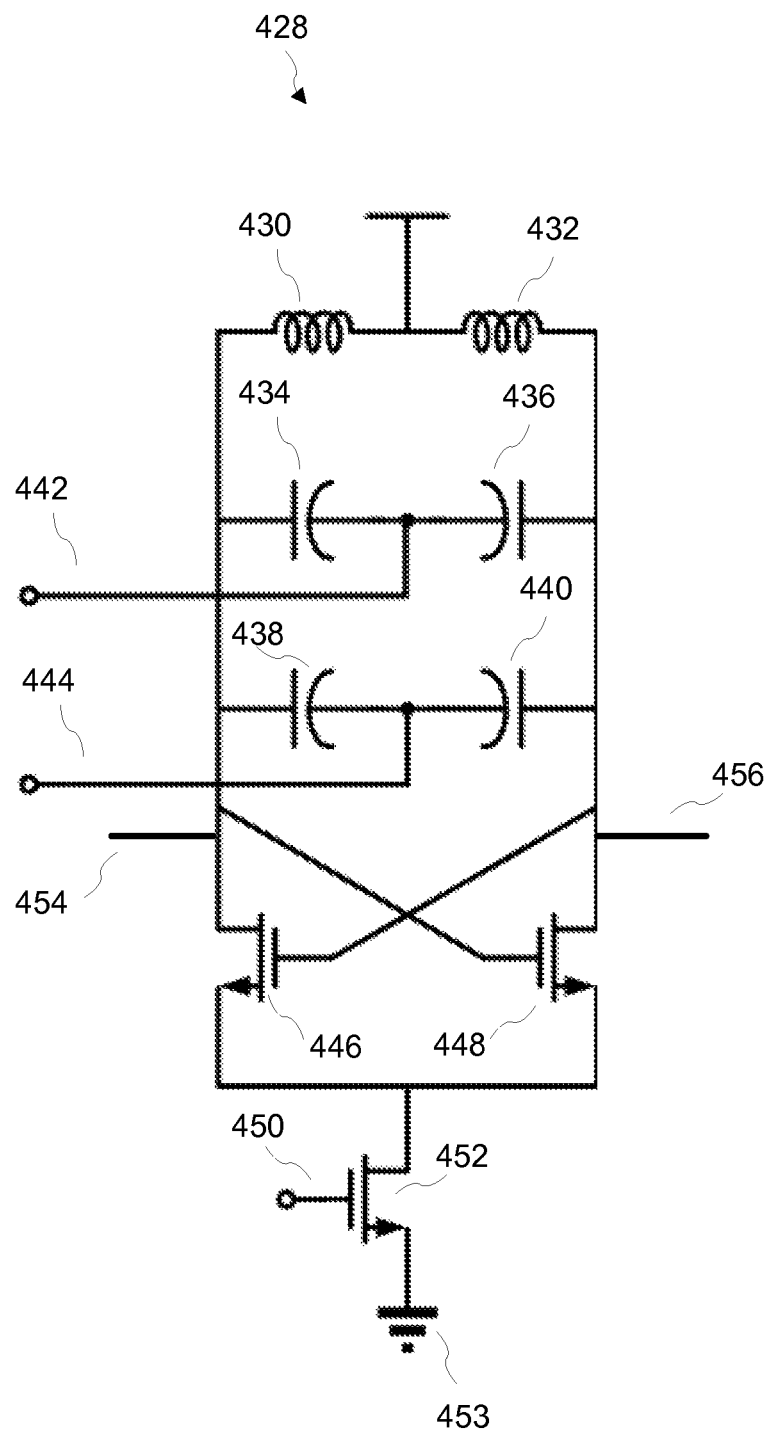
FIG. 5 illustrates a circuit block diagram of an injection-locked oscillator according to an embodiment.

FIG. 5 illustrates a circuit block diagram of an ILO 428 according to an embodiment. For an embodiment, an ILO 428 includes a first inductor 430 coupled with a second inductor 432 in series. A first inductor 430 and second inductor 432 is coupled with a voltage 431 to power the ILO 428. An ILO 428, for an embodiment, includes a first capacitor 434 coupled with a second capacitor 436 in series. A first capacitor 434 and a second capacitor 436 coupled with first inductor 430 and second inductor 432 in parallel. According to an embodiment, an ILO 428 includes a third capacitor 438 coupled with a fourth capacitor 440 in series. A third capacitor 438 and a fourth capacitor 440 are coupled with a first inductor 430 and a second inductor 432, and a first capacitor 434 and a second capacitor 436 in parallel.

For an embodiment, one or more of first capacitor 434, second capacitor 436, third capacitor 438, and fourth capacitor 440 are implemented using a variable capacitor. A variable capacitor includes, but is not limited to, a varactor, a digitally tuned capacitor such as one configured to adjust capacitance by switching between capacitors, and other components configured to adjust their capacitance. An embodiment includes a first capacitor 434 and a second capacitor 436 implemented using variable capacitors with a third capacitor 438 and a fourth capacitor 440 implemented using capacitors with fixed capacitances. Another embodiment includes all for capacitors implemented using variable capacitors. Yet another embodiment includes a first capacitor 434 and a second capacitor 436 implemented using capacitors with fixed capacitances with a third capacitor 438 and a fourth capacitor 440 implemented using variable capacitors.

According to an embodiment the values of the inductors and capacitors are used to tune the ILO to a resonant frequency. For an embodiment using one or more varactors, the capacitance of a varactor may be adjusted using a control voltage to tune a resonant frequency of an ILO. For an embodiment using one or more digitally tuned capacitors, the capacitance of a digitally tuned capacitor may be adjusted using one or more bits to select among different capacitance values. For an embodiment, an FSM is configured to control a capacitance value of one or more variable capacitors using a control signal using techniques including those described herein.

According to the embodiment illustrated in FIG. 5, the resonant frequency of an ILO is determined by $$\frac{1}{2\pi\sqrt{L(C1+C2)}};$$

where L is the effective inductance of a first inductor 430 in series with a second inductor 432, C1 is the effective capacitance of a first capacitor 434 in series with a second capacitor 436, and C2 is the effective capacitance of a third capacitor 438 in series with a fourth capacitor 440. By way of example and not limitation, an ILO may be tuned to have a resonant frequency of 1.59 GHz by using values of inductors such that L is equal to an inductance of 5 nanohenries ("nH"), and using values of capacitors such that C1 and C2 is each equal to a capacitance of 1 picofarads ("pF"). Using the above equation, one skilled in the art would understand that different values of components may be used to achieve a desired resonant frequency of an ILO.

According to the embodiment illustrated in FIG. 5, ILO 428 includes a first transistor 446 and a second transistor 448 configured as a cross-coupled transistors. A first inductor 430 and a second inductor 432, a first capacitor 434 and a second capacitor 436, and a third capacitor 438 and a fourth capacitor 440 are coupled in parallel with a first transistor 446 and a second transistor 448 configured as cross-coupled transistors. A first transistor 446 and a second transistor 448 configured as cross-coupled transistors, according to an embodiment, are coupled with a third transistor 452. A third transistor 452 is also coupled to a low potential such as ground, for an embodiment. For an embodiment, an ILO 428 may be implemented using transistors including metal-oxide semiconductor field-effect transistors ("MOSFET"). However, one skilled in the art would understand that other types of transistors could be used. For an ILO implemented using N-channel MOSFETs, a first capacitor 434 and a second capacitor 436, and a third capacitor 438 and a fourth capacitor 440 are coupled in parallel with to a drain of a first transistor 446 and a drain of a second transistor 448 configured as cross-coupled and a third transistor 452 is coupled with a source of the first transistor 446 and the second transistor 448.

An ILO 428, according to an embodiment, includes a reference frequency input 442 configured to receive a frequency reference from an ILO control circuit such as a PLL or an FLL. As illustrated in FIG. 5, an ILO 428 is configured to receive a reference input 442 between a first capacitor 434 and a second capacitor 436. For an embodiment, a reference input 442 is used to control the resonance frequency of the ILO 428 using techniques including those described herein. An ILO 428 is configured to receive a signal including a BPSK signal using a first injection input 444. For an embodiment, an ILO 428 is configured to receive a first injection signal on a first injection signal input 444 between a third capacitor 438 and a forth capacitor 440. For an embodiment, a reference input 442 is a low frequency control used to adjust a resonance frequency of an ILO and a reference input 444 is a high frequency control used to adjust the resonance frequency of an ILO.

According to an embodiment, an ILO 428 may include a second injection input 450 for receiving a signal. According to an embodiment illustrated in FIG. 5, an ILO 428 is configured to receive a second injection signal on a second injection signal input 450 at a gate of a third transistor 452. For some embodiments, a first injection input 444 and a second injection input 450 may be both used to input a signal in to an ILO 428. An ILO 428 is configured generate a positive ILO output signal on a positive ILO output 454 and a negative ILO output signal on a negative ILO output 456.

Figure 6:
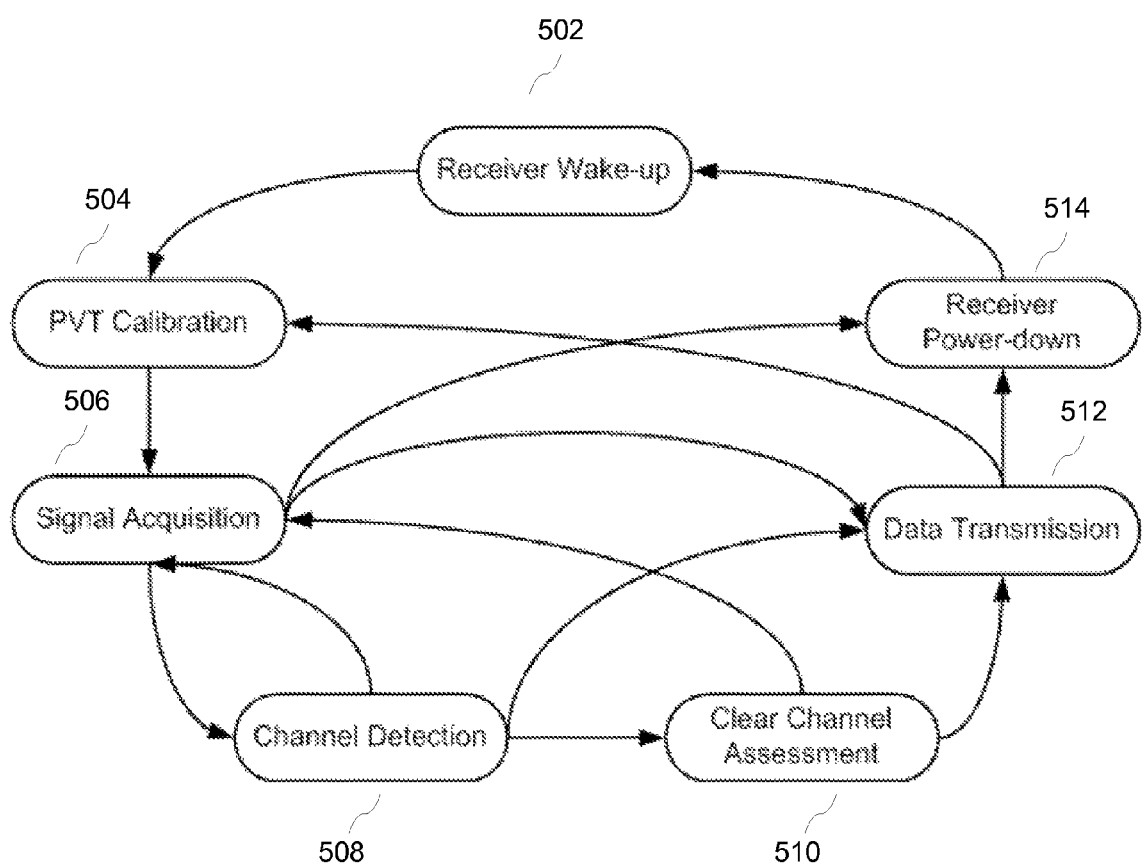
FIG. 6 illustrates a process for implementing a finite state machine according to an embodiment.

FIG. 6 illustrates a process for implementing a finite state machine according to an embodiment. The initial state, according to an embodiment, is a receiver wake-up state 502, which usually occurs after a receiver power-down state 514. For an embodiment, a finite state machine is configured to power up one or more components of an ILO control circuit such as a PLL or an FLL of a receiver. A finite state machine in a receiver wake-up state 502 is configured to turn on one or more of components including, but not limited to, a crystal oscillator, a prescaler, a charge pump, and other circuitry of an ILO control circuit. For an embodiment, an FSM is configured to control power up or power down of components by setting a register in one or more components in an ILO control circuit using techniques known in the art. At a power voltage and temperature ("PVT") calibration state 504 a FSM is configured to calibrate out the error as a result of variances caused by one or more of a manufacture process, a power supply voltage, and an operating temperature ("PVT"). For an embodiment, an FSM is configured to lock an ILO at a frequency using a reference frequency signal. For an embodiment, an FSM is configured to set an ILO frequency by adjusting operation values of an ILO control circuit. An FSM is configured, according to an embodiment, to setting one or more registers in to set one or more divide factors in an ILO control circuit to set a frequency using techniques including those described herein. For an embodiment, an FSM is configured to turn on an ILO control circuit without an input BPSK signal to an ILO by turning the power to an amplifier off using a control signal from an FSM using techniques including those described herein. For an embodiment, a control signal to turn off the power is a 5 volt signal. An FSM is configured to receive a voltage signal from a frequency divider that is based on the frequency of the crystal oscillator of an ILO control circuit. An FSM is configured to adjust the voltage of the crystal oscillator until the voltage signal from the frequency divider indicates the desired frequency of the crystal oscillator. For an embodiment, the voltage signal from a desired voltage from a frequency divider is 2.5 volts or is a pulse width modulated signal having a duty cycle of 50%. An FSM then sets the voltage level of the crystal oscillator at that voltage until the FSM reenters the PVT calibration state 504.

According to an embodiment, the process may enter a PVT calibration state 504 from a data transmission state 512. For an embodiment, an FSM enters a PVT calibration state 504 from a data transmission state 512 after an amount of time determined by setting a timer or a counter. An FSM may also enter a PVT calibration state 504 from a data transmission state 512 upon a detection of a frequency shift in a received signal. After calibration in performed in PVT calibration state 504, an FSM enters into signal acquisition state 506. In this state, a signal having a carrier frequency will be determined to be acquired when a power of a signal reaches a threshold level. For an embodiment, an FSM may determine a power of a signal reaches a threshold level by measuring the signal envelop power using techniques known in the art. A threshold level is set based on desired performance level of a receiver and may be defined by a wireless standard. The process moves to channel detection state 508 upon a determination by the FSM that a signal is acquired. According to an embodiment, a FSM determines a channel is detected when a frequency error of an ILO control circuit is within a range. A frequency error is based on an output of a detector of the ILO control circuit such as a frequency difference signal according to an embodiment. For an embodiment, when a FSM determines that a frequency error is within 0.01% (or 100 ppm), the FSM determines that a channel is detected. One skilled in the art would understand that other frequency error ranges may be set based on a desired performance of a receiver.

At a clear channel assessment state 510, an FSM is configured to determine the channel quality. For an embodiment, an FSM determines that the channel based on a determined signal to noise ratio using techniques known in the art. For an embodiment if a signal to noise ratio is below 20 dB, an FSM determines that the channel quality is not sufficient. The process can move to either a channel detection state 508 or a clear channel assessment 510 state can go back to the signal acquisition state 506 if an FSM determines that a channel is not valid or the channel quality is not sufficient. If an FSM determines that either a channel is not detected or that the channel quality is low, a process moves back to the signal acquisition state 506. For an embodiment, if an FSM determines the process enters the signal acquisition state several times with in a period of time the process moves to a receiver power-down state 514.

According to an embodiment, a data transmission state 512 can occur after a signal acquisition state 506. For example, a process may enter a data transmission state 512 from a signal acquisition state 506 within an amount of time after a leaving a data transmission state 512 when an FSM determined that the last data transmission was successful. Alternatively, a process may enter a channel detection state 508. For an embodiment, a process may transition from a channel detection state 508 to a data transmission state 512 for various data transmission modes. For an example, an FSM may be configured to operate in one or more data transmission modes that configure a process to transition from a channel detection state 508 to data transmission state 512 upon detecting a channel. When an end of a data transmission is detected, a process enters a PVT calibration state 504 where an FSM is configured to re-calibrate the PVT error for further transmission, or go to a receiver power-down state 514. For an embodiment, an FSM determines the end of a data transmission for example when a channel is no longer detected, an end of bit stream is detected, or other techniques for detecting an end of a data stream as known in the art. The above described states and the transition conditions are one example of a general scenario, and the present disclose is not limited to the specific examples shown. Many other scenarios are possible within the spirit and scope of the present teaching. Additional states and transition conditions are within the spirit and scope of the present teaching and are not precluded in different applications.

Figure 7:
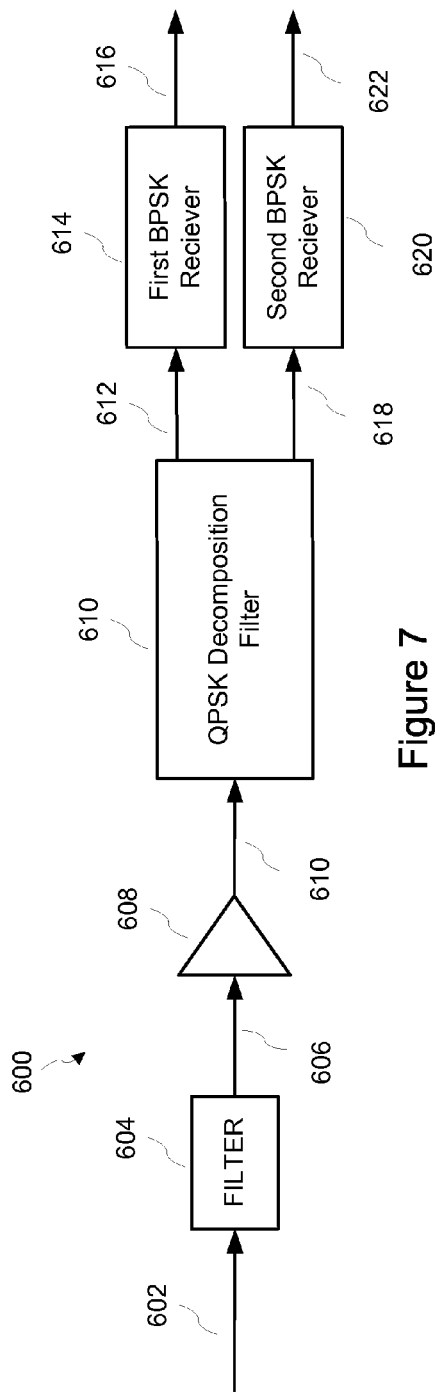
FIG. 7 illustrates a block diagram of a receiver architecture for processing a QPSK signal according to an embodiment.

FIG. 7 illustrates a block diagram of a receiver architecture 600 for processing a QPSK signal according to an embodiment. According to an embodiment illustrated in FIG. 7, a filter 604 is configured to receive a QPSK signal 602. For an embodiment, a QPSK signal 602 may be from an antenna and/or circuitry including, but not limited to, one or more components known in the art to receive, amplify, shape, or otherwise receive a signal propagating through a medium including, but not limited to, a conductor, air, and glass such as a fiber optic cable. A filter 604 may be implemented using techniques including those described herein. For an embodiment, a filter 604 is a band-pass filter. According to an embodiment, a QPSK signal 602 is filtered by a filter 604 configured as a band-pass filter ("BPF") which selects the signal band centered at a carrier frequency (fc) to be processed.

As illustrated in FIG. 7, a filter 604 is coupled with an amplifier 608. An amplifier 608 may be implemented using techniques such as those described herein. For an embodiment, amplifier 608 is a low-noise amplifier ("LNA") such as those described herein. An amplifier 608, according to an embodiment, is coupled with a QPSK to BPSK converter such as a QPSK decomposition filter 610. A QPSK decomposition filter 610, according to an embodiment, is configured to decompose a received amplified QPSK signal 610 into two BPSK signals, a first BPSK signal 612 and a second BPSK signal 618. For an embodiment, a QPSK decomposition filter 610 is configured to decompose an amplified QPSK signal 610 into an in-phase channel of the amplified QPSK signal 610 and a quadrature-phase channel of the amplified QPSK signal 610. According to an embodiment, a first BPSK signal 612 is the in-phase channel of an amplified QPSK signal 610 and a second BPSK signal 618 is the quadrature-phase channel of the amplified QPSK signal 610. For another embodiment, a second BPSK signal 618 is the in-phase channel of an amplified QPSK signal 610 and a first BPSK signal 612 is the quadrature-phase channel of the amplified QPSK signal 610. According to an embodiment, a first BPSK signal 612 and a second BPSK signal 618 are half the data rate of the input QPSK signal 602 and a symbol rate equal to the input QPSK signal 602.

According to the embodiment illustrated in FIG. 7, a QPSK decomposition filter 610 is coupled with a first BPSK receiver 614 and a second BPSK receiver 620. A first BPSK receiver 614 is configured to receive a first BPSK signal 612 from a QPSK decomposition filter 610. The second BPSK receiver 620 is configured to receive a second BPSK signal 618 from a QPSK decomposition filter 610. According to an embodiment, a first BPSK receiver 614 and a second BPSK receiver 620 are implemented using techniques such as those described herein. A BPSK receiver 614 is configured to generate a first demodulated output signal 616 based on a first BPSK signal 612 and a second BPSK receiver 620 is configured to generate a second demodulated output signal 622 based on a second BPSK signal 618. According to an embodiment, a first demodulate output signal 616 and a second BPSK signal 622 are further processed using techniques known in the art to decode, process, or otherwise transform the demodulated output signals into another form.

Figure 8:
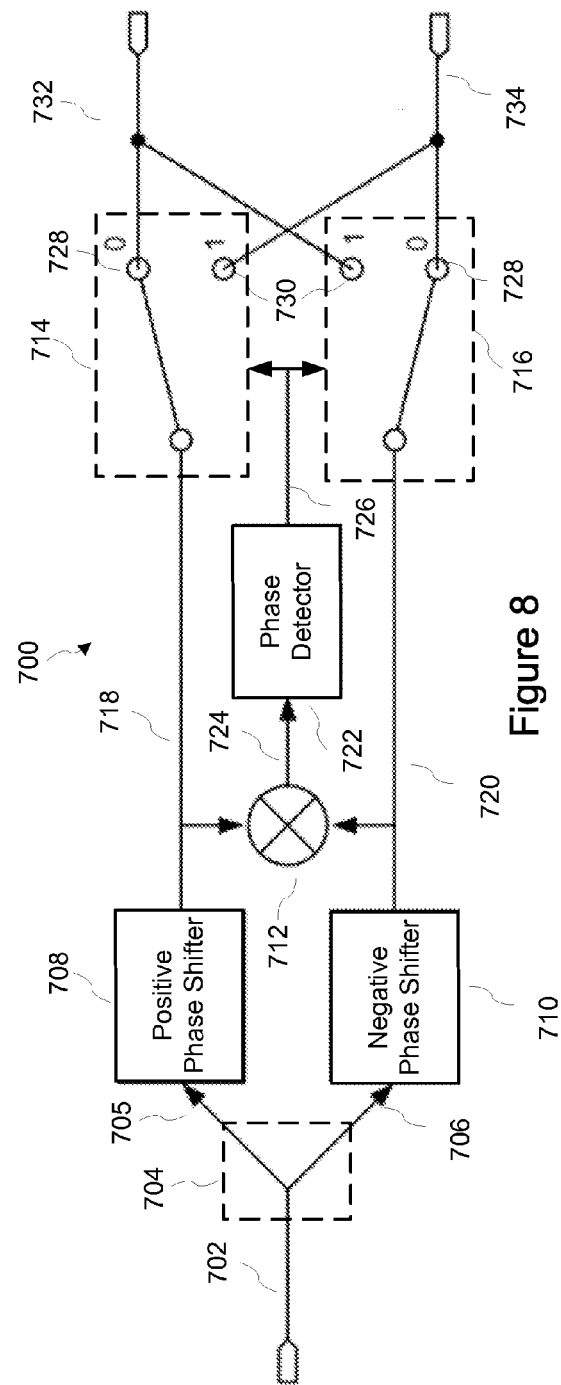
FIG. 8 illustrates a circuit block diagram of a QPSK decomposition filter according to an embodiment.

FIG. 8 illustrates a circuit block diagram of a QPSK to BPSK converter such as a QPSK decomposition filter 700 according to an embodiment. An input QPSK signal 702 is split into two channels. According to an embodiment, an input QPSK signal 702 is split into two channels using a power divider such as those known in the art. For an embodiment, a power divider is configured to generate a first channel signal with a positive forty-five degree ("+45°") phase shift with respect to an input QPSK signal 702 and a second channel signal with a negative forty-five degree ("−45°") phase shift with respect to the input QPSK signal 702. Such a power divider 704 includes phase shifters to generate a first channel signal 718 with positive forty-five degree ("+45°") phase shift with respect to an input QPSK signal 702 and a second channel signal 720 with a negative forty-five degree ("−45°") phase shift with respect to the input QPSK signal 702.

According to the embodiment illustrated in FIG. 8, a power divider 704 is coupled with a positive phase shifter 708 and negative phase shifter 710. For an embodiment, a positive phase shifter 708 is configured to shift a phase of a signal by a positive forty-five degrees ("+45°"). A negative phase shifter 710, according to an embodiment, is configured to shift a phase of a signal by a negative forty-five degrees ("−45°"). A phase shifter may be implemented as a PIN-diode phase shifter, a loaded-line phase shifter, a reflection-type phase shifter, or another circuit for changing a phase of a signal. As illustrated in FIG. 8, an embodiment includes a positive phase shifter 708 coupled with a mixer 712 and a first switch 714. A negative phase shifter 710, according to an embodiment, is coupled to a mixer 712 and a second switch 716. A mixer 712 is configured to receive a first phase shifted signal 718 from a positive phase shifter 708 and a second phase shifted signal 720 from a negative phase shifter 710. A mixer 712 may be implemented using techniques including those described herein.

For an embodiment, a mixer 712 is coupled with a phase detector 722. The mixer 712 generates a mixed signal 724 that is the product of a first phase shifted signal 718 and a second phase shifted signal 720. A phase detector 722 generates a phase output signal 726 based on the phase of a mixed signal 724. A phase output signal 726 may vary in voltage and/or current based on changes in a phase of a mixed signal 724 received by a phase detector 722. For an embodiment, a phase output signal 726 is a signal that varies between a high voltage and a low voltage based on a mixed signal 724 received by a phase detector 722. For an embodiment, a high voltage is a voltage level equivalent to a logic 1 and a low voltage is a voltage level equivalent to a logic 0. A phase detector 722 may be implemented using techniques including those described herein.

According to the embodiment illustrated in FIG. 8, a phase detector 722 is coupled with a first switch 714 and a second switch 716. The first switch 714 and the second switch 716, according to an embodiment, are controlled by a phase output signal 726 from a phase detector 722. If the phase of a mixed signal 724 is $\pi/2$ radians, phase detector 722 is configured to generate a phase output signal 726 to switch a first switch 714 and a second switch 716 to a "0" state 728. If the phase of a mixed signal 724 is $3\pi/2$ radians, phase detector 722 is configured to generate a phase output signal 726 to switch a first switch 714 and a second switch 716 to a "1" state 730. For an embodiment, a first switch 714 and a second switch 716 select between a "0" state 728 and a "1" state 730 based on a phase output signal 726 from a phase detector 726.

According to the embodiment illustrated in FIG. 8, a first switch 714 is configured to use a first phase shifted signal 718 to produce a first BPSK signal 732 when the first switch 714 is in a "0" state 728 and the first switch 714 is configured to use the first phase shifted signal 718 to produce a second BPSK signal 734 when the first switch 714 is in a "1" state 730. A second switch 716 is configured to use a second phase shifted signal 720 to produce a second BPSK signal 734 when the second switch 716 is in a "0" state 728 and the second switch 716 is configured to use the second phase shifted signal 720 to produce a first BPSK signal 732 when the second switch 716 is in a "1" state 730. According to an embodiment, a QPSK decomposition filter 700 generates two channels of BPSK signals, a first BPSK signal 732 and a second BPSK signal 734. The data rate of a BPSK signal in each channel, according to an embodiment, is half of the data rate in a QPSK signal 702, while the symbol rate of a BPSK signal in each channel will be the same symbol rate of the QPSK signal 702.

Figure 9:
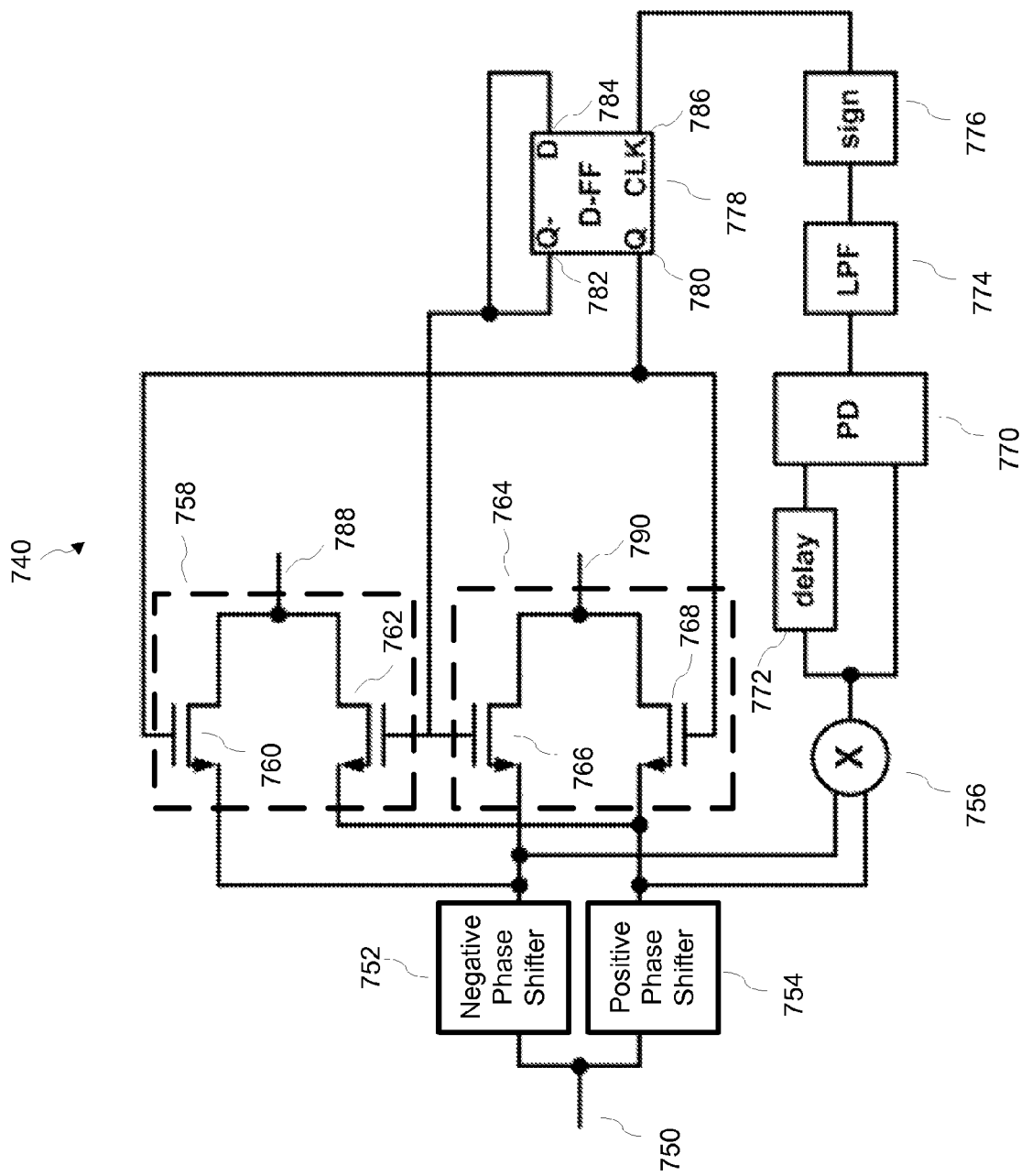
FIG. 9 illustrates a circuit block diagram of a QPSK decomposition filter including a switch control circuit according to an embodiment.

FIG. 9 illustrates a circuit block diagram of a QPSK to BPSK converter such as a QPSK decomposition filter 740 including a switch control circuit according to an embodiment. An input QPSK signal 750 is split into two channels using techniques such as those described herein. According to the embodiment illustrated in FIG. 9, one channel is coupled with a positive phase shifter 754 implemented using techniques including those described herein. For an embodiment, a positive phase shifter 754 is a positive forty-five degree ("+45°") phase shifter. A second channel is coupled with a negative phase shifter 752 implemented using techniques including those described herein. For an embedment, a negative phase shifter 752 is a negative forty-five degree ("−45°") phase shifter.

As illustrated in FIG. 9, an embodiment includes a positive phase shifter 754 coupled with a mixer 756, a first switch 758, and a second switch 764. A negative phase shifter 752, according to an embodiment, is coupled to a mixer 756, a first switch 758, and a second switch 764. A first switch 758 is implemented using a first transistor 760 and a second transistor 762. A second switch 764 is implemented using a third transistor 766 and a fourth transistor 768. A mixer 756 may be implemented using techniques such as those described herein.

For an embodiment, a mixer 756 is coupled with a phase detector 770 directly and through a delay circuit 772. For an embodiment, a delay circuit 772 is configured to delay an output from the mixer 756 by a few nanoseconds. For an embodiment, a delay circuit 1024 is configured to delay an output from the mixer 1008 by a time in a range including 1 nanosecond up to and including 20 nanoseconds. A delay circuit 772, according to an embodiment, is implemented as a resistor-capacitor ("RC") circuit. A phase detector 770 may be implemented using techniques such as those described herein. A phase detector 770 is coupled with a low-pass filter 774 implemented using techniques including those described herein. Low-pass filter 774 is coupled with a sign detector ("sign") 776 configured to determine the sign of the output of the low-pass filter based on a certain threshold voltage such as half of the power supply voltage. For an embodiment, a sign detector is implemented as a comparator using techniques known in the art. A sign detector 776 is coupled with a switch control circuit implemented using a D flip flop 778. D flip flop 778 including a Q output 780, Q-output 782, a D input 784, and a clock input 786. For an embodiment, the output from sign inverter 776 is coupled with a clock input 786 of D flip flop 778. Q output 780 is coupled with first transistor 760 of first switch 758 and with a forth transistor 768 of second switch 764. Q-output 782 is coupled with D input 784 of a D flip flop 778, with second transistor 762 of first switch 758, and with third transistor 766 of second switch 764. D flip flop 778 is configured to switch a first switch 758 and a second switch 764 to generate a first BPSK signal 788 and a second BPSK signal 790 by selecting between an output from a negative phase shifter 752 and an output of a positive phase shifter 754 as described herein with regard to a QPSK decomposition filter.

Figure 10:
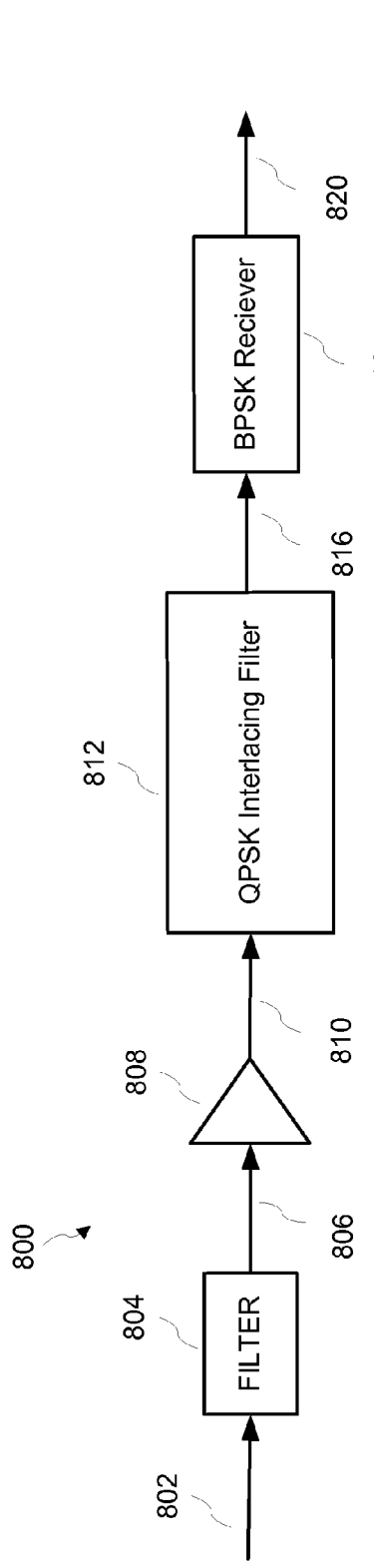
FIG. 10 illustrates a circuit block diagram of an receiver architecture including a QPSK interlacing filter according to an embodiment.

FIG. 10 illustrates a circuit block diagram of an receiver architecture 800 including a QPSK to BPSK converter such as a QPSK interlacing filter according to an embodiment. According to an embodiment illustrated in FIG. 10, a filter 804 is configured to receive a QPSK signal 802. For an embodiment, a QPSK signal 802 may be from an antenna and/or circuitry including, but not limited to, one or more components configured to receive, amplify, shape, or otherwise receive a signal propagating through a medium including, but not limited to, a conductor, air, and glass such as a fiber optic cable. A filter 804 may be implemented using techniques including those described herein. For an embodiment, a filter 804 is configured as a band-pass filter. According to an embodiment, an input QPSK signal 802 is filtered by a filter 804 configured as a band-pass filter ("BPF") which selects the signal band centered at a carrier frequency (fc) to be processed.

As illustrated in FIG. 10, a filter 804 is coupled with an amplifier 808. An amplifier 808 may be implemented using techniques such as those described herein. For an embodiment, amplifier 808 is a low-noise amplifier ("LNA") such as those described herein. An amplifier 808, according to an embodiment, is coupled with a QPSK interlacing filter 812. A QPSK interlacing filter 812, according to an embodiment, is configured to generate a BPSK signal 816 based on a QPSK signal such as an amplified QPSK signal 810. According to an embodiment, a BPSK signal 816 generated with the same data rate as a QPSK signal 802 and a symbol rate that is double the symbol rate of the a QPSK signal 802.

According to the embodiment illustrated in FIG. 10, a QPSK interlacing filter 812 is coupled with a BPSK receiver 818. A BPSK receiver 818 is configured to receive a BPSK signal 816 generated by a QPSK interlacing filter 812. A BPSK receiver 818 is configured to generate a demodulated output signal 820 based on a BPSK signal 816. According to an embodiment, a demodulate output signal 820 is further processed using techniques known in the art to decode or otherwise transform the demodulated data into another form.

Figure 11:
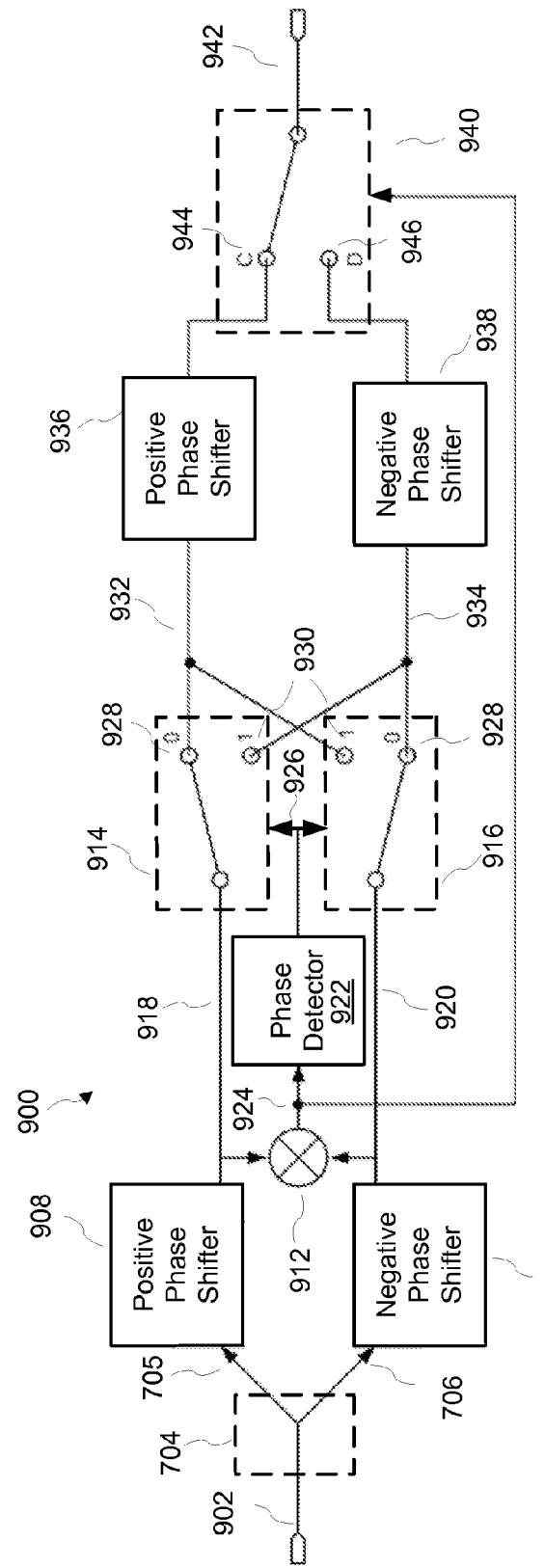
FIG. 11 illustrates a circuit block diagram of a QPSK interlacing filter according to an embodiment.

FIG. 11 illustrates a circuit block diagram of a QPSK to BPSK converter such as a QPSK interlacing filter 900 according to an embodiment. A QPSK signal 902 is split into two channels. According to an embodiment, an input QPSK signal 902 is split into two channels using a power divider 904 such as those known in the art. For an embodiment, a power divider is configured to generate a first channel signal 905 with positive forty-five degree ("+45°") phase shift with respect to a QPSK signal 902 and a second channel signal 906 with a negative forty-five degree ("−45°") phase shift with respect to the QPSK signal 902. Such a power divider 904 includes phase shifters to generate a first channel signal 905 with a positive forty-five degree phase shift with respect to a QPSK signal 902 and a second channel signal 906 with a negative forty-five degree phase shift with respect to the QPSK signal 902.

According to the embodiment illustrated in FIG. 11, a power divider 904 is coupled with a positive forty-five degree ("+45°") phase shifter 908 and negative forty-five degree ("−45°") phase shifter 910. A phase shifter may be implemented using techniques including those described herein. As illustrated in FIG. 11, an embodiment includes a positive phase shifter 908 coupled with a mixer 912 and a first switch 914. A negative phase shifter 910, according to an embodiment, is coupled to a mixer 912 and a second switch 916. A mixer 912 is configured to receive a first phase shifted signal 918 from a positive phase shifter 908 and a second phase shifted signal 920 from a negative phase shifter 910. A mixer 912 may be implemented using techniques such as those described herein.

For an embodiment, a mixer 912 is coupled with a phase detector 922. The mixer 912 is configured to generate a mixed signal 924 that is the product of a first phase shifted signal 918 and a second phase shifted signal 920. A phase detector 922 is configured to generate a phase output signal 926 based on the phase of a mixed signal 924. A phase output signal 926 may vary in voltage and/or current based on changes in a phase of a mixed signal 924 received by a phase detector 922. For an embodiment, a phase output signal 926 is a signal that varies between a high voltage and a low voltage based on a mixed signal 924 received by a phase detector 922. For an embodiment, a high voltage is a voltage level equivalent to a logic "1" and a low voltage is a voltage level equivalent to a logic "0".

A phase detector 922 may be implemented using techniques such as those described herein.

According to the embodiment illustrated in FIG. 11, phase detector 922 is coupled with a first switch 914 and a second switch 916. The first switch 914 and the second switch, according to an embodiment, are configured to be controlled by a phase output signal 926 from a phase detector 922. If the phase of a mixed signal 924 is π/2 radians, phase detector 922 is configured to generate a phase output signal 926 to switch a first switch 914 and a second switch 916 to a "0" state 928. If the phase of a mixed signal 924 is 3π/2 radians, phase detector 922 is configured to generate a phase output signal 926 to switch a first switch 914 and a second switch 916 to a "1" state 930. For an embodiment, a first switch 914 and a second switch 916 alternate between a "0" state 928 and a "1" state 930 based on a phase output signal 926 from a phase detector 926. According to the embodiment illustrated in FIG. 11, a first switch 914 is configured to use a first phase shifted signal 918 to produce a first BPSK signal 932 when the first switch 914 is in a "0" state 928 and the first switch 914 is configured to use the first phase shifted signal 918 to produce a second BPSK signal 934 when the first switch 914 is in a "1" state 930. A second switch 916 is configured to use a second phase shifted signal 920 to produce a second BPSK signal 934 when the second switch 916 is in a "0" state 928 and the second switch 916 is configured to use the second phase shifted signal 920 to produce a first BPSK signal 932 when the second switch 916 is in a "1" state 930. According to an embodiment, a QPSK interlacing filter 900 generates two channels of BPSK signals, a first BPSK signal 932 and a second BPSK signal 934.

According to the embodiment illustrated in FIG. 11, a first switch 914 is coupled with a second positive forty-five degree phase shifter 936 and a second switch 916 is coupled with a second negative forty-five degree phase shifter 938. A second positive forty-five degree phase shifter 936 is configured to shift the phase of a first BPSK signal 932 shifted by forty-five degrees using techniques such as those described herein. A second negative forty-five degree phase shifter 938 is configured to shift the phase of a second BPSK signal 934 by a negative forty-five degrees using techniques such as those described herein. According to an embodiment, a second positive forty-five degree phase shifter 936 and a second negative forty-five degree phase shifter 938 are coupled with a third switch 940. A third switch 940, according to an embodiment, is configured to select between the output from a second positive forty-five degree phase shifter 936 and the output of the second negative forty-five degree phase shifter 938. A third switch 940 generates a BPSK output 942 based on the output from a second positive forty-five degree phase shifter 936 and the output of the second negative forty-five degree phase shifter 938.

According to the embodiment illustrated in FIG. 11, a mixer 912 is coupled with the third switch 940. A third switch 940 is configured to receive a mixed signal 924 generated by the mixer 912. For an embodiment, a third switch 940 is configured to select between a "C" state 944 and a "D" state 946 based on mixed signal 924. According to the embodiment illustrated in FIG. 11, a third switch 940 is configured to use the output of a positive phase shifter 936 to produce an output BPSK signal 942 when the third switch 940 is in the "C" state 944. A third switch 940 is configured to use the output of a negative phase shifter 938 to produce an output BPSK signal 942 when the third switch 940 is in the "D" state 946. According to an embodiment, a third switch 940 is configured to alternate between "C" state 944 and "D" state 946 of the third switch 940 based on the phase of a mixed signal 924. For an embodiment, an output BPSK signal 942 produced by a third switch 940 has the same data rate as a QPSK signal 902 and a symbol rate that is double the symbol rate of the QPSK signal 902.

Figure 12:
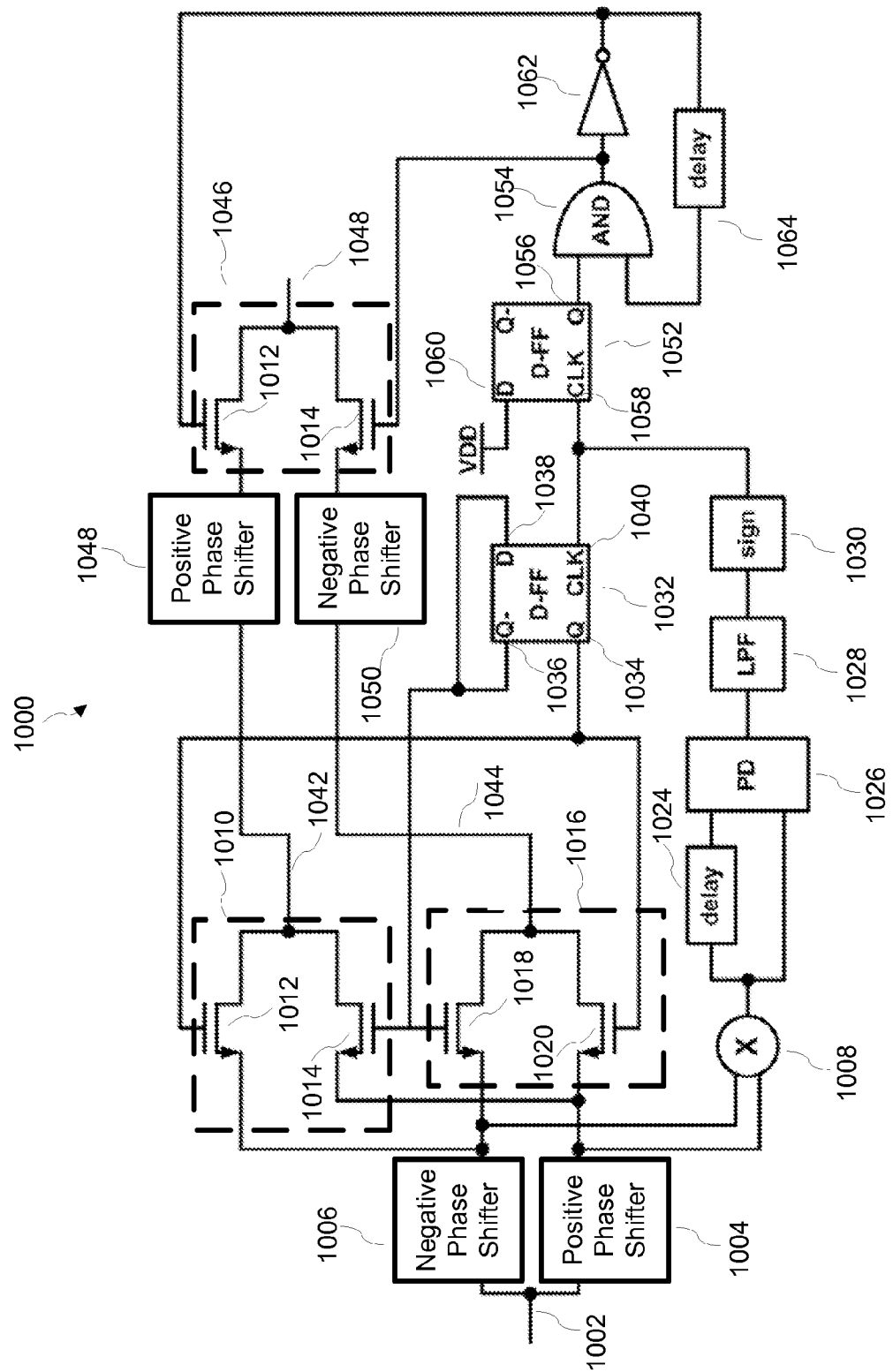
FIG. 12 illustrates a circuit block diagram of a QPSK interlacing filter including switch control circuits according to an embodiment.

FIG. 12 illustrates a diagram of a QPSK interlace filter 1000 including switch control circuits according to an embodiment. A QPSK signal 1002 is split into two channels using techniques including those described herein. According to an embodiment, one channel is coupled with a positive phase shifter 1004 implemented using techniques including those discussed herein. For an embodiment, a positive phase shifter 1004 is a positive forty-five degree ("+45°") phase shifter. A second channel is coupled with a negative phase shifter 1006 implemented using techniques including those discussed herein. For an embedment, a negative phase shifter 1006 is a negative forty-five degree ("−45°") phase shifter.

As illustrated in FIG. 12, an embodiment includes a positive phase shifter 1004 coupled with a mixer 1008, a first switch 1010, and a second switch 1016. A negative phase shifter 1006, according to an embodiment, is coupled to a mixer 1008, a first switch 1010, and a second switch 1016. A first switch 1010 is implemented using a first transistor 1012 and a second transistor 1014. A second switch 1016 is implemented using a third transistor 1018 and a fourth transistor 1020. A mixer 1008 may be implemented using techniques such as those described herein.

For an embodiment, a mixer 1008 is coupled with a phase detector 1026 directly and through a delay circuit 1024. For an embodiment, a delay circuit 1024 delays an output from the mixer 1008 by a few nanoseconds using techniques including those described herein. For an embodiment, a delay circuit 1024 is configured to delay an output from the mixer 1008 by a time in a range including 1 nanosecond up to and including 20 nanoseconds. A phase detector 1026 may be implemented using techniques such as those described herein. A phase detector 1026 is coupled with a low-pass filter 1028 implemented using techniques including those described herein. A low-pass filter 1028 is coupled with a sign detector 1030 configured to determine the sign of the output of the low-pass filter based on a certain threshold voltage such as half of the power supply voltage using techniques such as those described herein. A sign inverter 1030 is coupled with a first switch control circuit implemented using a D flip flop 1032. A D flip flop 1032 includes a Q output ("Q") 1034, a Q-output ("Q-") 1036, a D input ("D") 1038, and a clock input ("CLK") 1040. For an embodiment, the output from sign inverter 1030 is coupled with a clock input 1040 of D flip flop 1032. Q output 1034 is coupled with first transistor 1012 of first switch 1010 and with a forth transistor 1020 of second switch 1016. Q-output 1036 is coupled with D input 1038, with a second transistor 1014 of first switch 1010, and with a third transistor 1018 of second switch 1016. A D flip flop 1032 is configured to switch a first switch 1010 and a second switch 1016 to generate a first BPSK signal 1042 and a second BPSK signal 1044 as described herein with regard to a QPSK interlacing filter 1000.

A third switch 1046, according to an embodiment, is configured to select between the output from a second positive phase shifter 1048 and the output of the second negative phase shifter 1050. For an embodiment, a second positive phase shifter 1048 is configured to shift a phase of a signal by a positive forty-five degrees and a second negative phase-shifter 1050 is configured to shift a phase of a signal by a negative forty-five degrees. The third switch 1046 is configured to generate a BPSK output 1048 based on the output from a second positive phase shifter 1048 and the output of the second negative phase shifter 1050.

According to the embodiment illustrated in FIG. 12, a sign inverter 1030 is coupled with a third D flip-flop 1052. A third D flip-flop 1052 is coupled with an AND gate 1054 and a first D flip-flop 1032. The second D flip-flop 1052, according to the embodiment illustrated in FIG. 12, includes a Q output 1056 coupled with an AND gate 1054. A second D flip-flop 1052 also includes a clock input 1058 coupled with sign inverter 1030. A D input 1060 of a second D flip-flop 1052 is coupled with a high potential such as a positive voltage ("VDD"). An AND gate 1054 is coupled with a third switch 1046. For an embodiment, an AND gate 1054 is coupled with a second transistor 1014 of a third switch 1046 and is coupled with a first transistor 1012 of the third switch 1046 through an inverter 1062. An inverter 1062 is also coupled with an input of the AND gate 1054 through a second delay circuit 1064. For an embodiment, a delay circuit 1064 is configured to delay an output from an inverter 1062 by half of a symbol period of an input QPSK signal 1002.

A second D flip-flop 1058, an AND gate 1054, an inverter 1062, and a second delay circuit 1064 are configured to act a control circuit for a third switch 1046 to select between an output of a second positive phase shifter 1048 and an output of a negative phase shifter 1050 based on an output of a mixer 1008. A third switch 1046 is configured to generate an output BPSK signal 1051 by selecting between an output of a second positive phase shifter 1048 and an output of a second negative phase shifter 1050 using techniques including those described herein with regard to QPSK interlacing filters.

Figure 13:
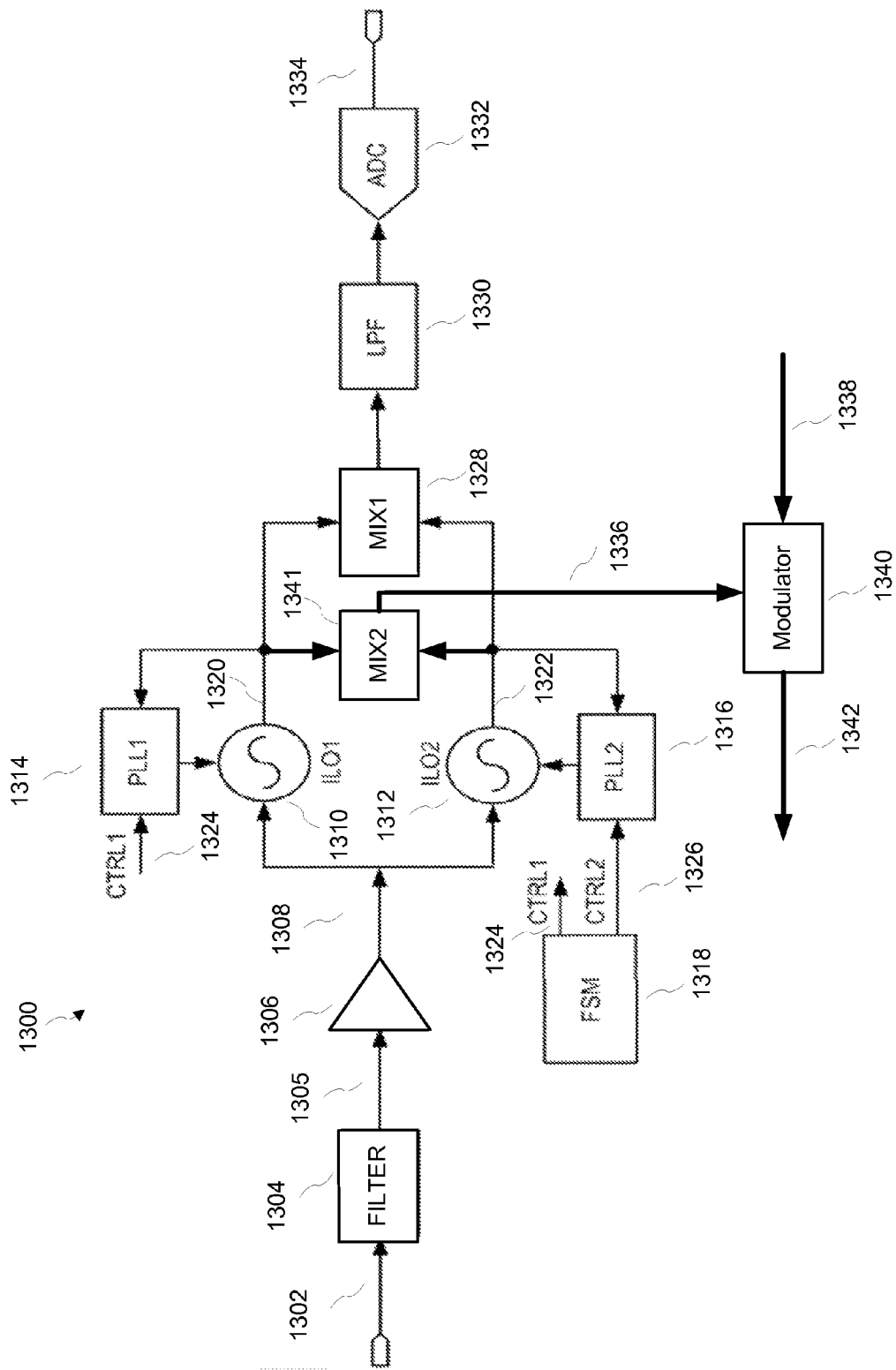
FIG. 13 illustrates a circuit block diagram of a transceiver architecture according to an embodiment.

FIG. 13 illustrates a circuit block diagram of a transceiver architecture 1300 according to an embodiment. According to an embodiment a transceiver architecture 1300 includes a BPSK receiver and a BPSK transmitter. A transceiver architecture 1300 for a transceiver according to an embodiment includes a modulator 1340 coupled with a second mixer ("MIX2") 1341. A second mixer 1341 is implemented using mixer techniques including those described herein. A second mixer 1341 is coupled with an ILO1 output 1320 and an IL02 output 1322. A second mixer 1341 is configured to generate a carrier frequency signal 1336 based on an ILO1 output 1320 and an IL02 output 1322. For an embodiment, a second mixer 1341 is configured to generate a carrier frequency signal 1336 having a frequency at the same carrier frequency as a BPSK signal 1302 received at a filter 1304.

For an embodiment, a modulator 1340 is a direct radio frequency modulator. A modulator is configured to receive a baseband signal 1338 including an analog or digital signal. For an embodiment, a baseband signal 1338 may be a digital bit stream. For an embodiment, a baseband signal 1338 is preprocessed before the signal is received by a modulator 1340 using techniques known in the art. For an embodiment, a transceiver architecture 1300 includes a filter such as a pulse shaping & pre-distortion finite impulse response (FIR) filter configured to preprocess a baseband signal 1338. A pulse shaping & pre-distortion FIR filter, according to an embodiment, is coupled with a modulator 1340.

A modulator may be implemented using a mixer including those implemented using techniques described herein. A modulator 1340 is configured to generate a modulated signal 1342. For an embodiment, a modulator 1340 is configured to generate a modulated signal 1342 having a carrier frequency equal to the frequency of a carrier frequency signal 1336. For an embodiment, a modulated signal 1342 may be amplified using an amplifier implemented using techniques including those described herein. An embodiment of a transceiver architecture may include one or more transmit circuits coupled with a modulator 1340 including, but not limited to, a transmit-receive switch, a power amplifier, a filter, an antenna, and other circuits used to transmit a modulated signal or condition a modulated signal for transmission.

According to the embodiment illustrated in FIG. 13, a transceiver architecture 1300 includes a receiver using an receiver architecture such as those described herein. An ILO control circuit such as a PLL1 1314 is coupled with an ILO1 1310 and an ILO control circuit such as a PLL2 1316 is coupled with an IL02 1312. For an embodiment, an ILO control circuits may be a PLL or a FLL as described herein. For an embodiment, a PLL1 1314 is configured to set an initial frequency of an ILO1 1310 at fc/2+Δf and a PLL2 1316 is configured to set an initial frequency of an IL02 1312 at fc/2−f using techniques including those described herein. As described herein, an ILO1 1310 and an IL02 1312 are configured to receive a BPSK signal such as an amplified BPSK signal 1308 having a carrier frequency of fc. ILO1 1310 and ILO 1312 will re-lock from their initial frequencies as set by their respective ILO control circuits to a frequency of fc/2.

As described above, a modulator is configured to receive a carrier frequency signal 1336 that is a mixing signal of an ILO1 output signal 1320 and an IL02 output signal 1322. The mixing of the outputs of ILO1 1310 and IL02 1312 will generate a carrier frequency signal 1336 having a carrier frequency of fc. A modulator is configured to generate a modulated signal 1342 at a carrier frequency of fc for transmitting. For an embodiment, the separation between an ILO frequency of fc/2+Δf (or an ILO frequency of fc/2−Δf) and a modulated signal for transmitting at a carrier frequency of fc reduces "pulling" problems in a transmitter, which is a frequency shift in the operating frequency of an oscillator, such as an ILO, caused by a strong transmitting signal. This can degrade performance in a receiving section in a transmitter.

According to the embodiment illustrated in FIG. 13, the transceiver includes a filter 1304 configured to receive a BPSK signal 1302 using techniques including those described herein. A filter 1304 is configured to generate a filtered BPSK signal 1305 using techniques such as those described herein. A filter 1304 is coupled with an amplifier 1306. For an embodiment, amplifier 1306 is configured according to techniques described above. For an embodiment, PLL1 1314 is coupled with an ILO1 output 1320 and a PLL2 1316 is coupled with an IL02 output 1322. An ILO1 output 1320 and an IL02 output 1322 are used as part of a feedback loop for PLL1 1314 and PLL2 1316, respectively using techniques including those described herein. For an embodiment, an FSM 1318 and a first control signal ("CTRL1") 1324 and a second control signal ("CTRL2") 1326 may be implemented using techniques described herein.

According to the embodiment illustrated in FIG. 13, the transceiver architecture 1300 includes a first mixer ("MIX1") 1328 coupled with an ILO1 1310 and an IL02 1312. A mixer 1328 may be configured using techniques including those described herein. For an embodiment, a mixer 1328 is coupled with a LPF 1330. A LPF 1330 may be implemented using techniques including those described herein. As further illustrated in FIG. 13, an embodiment includes a LPF 1330 coupled with an ADC 1332. For an embodiment, a LPF 1330 may be coupled with an ADC 1332 using techniques including those described herein. An ADC 1332, according to an embodiment, may be implemented using techniques such as those described herein to generate an output signal 1334 including, but not limited to, a bit sequence and another form of a baseband signal based on an BPSK signal 1302. A transceiver architecture 1300, according to an embodiment, may include a receiver including a QPSK to BPSK converter including a QPSK decomposition filter such as those described herein and a QPSK interlace filter such as those described herein.

Figure 14:
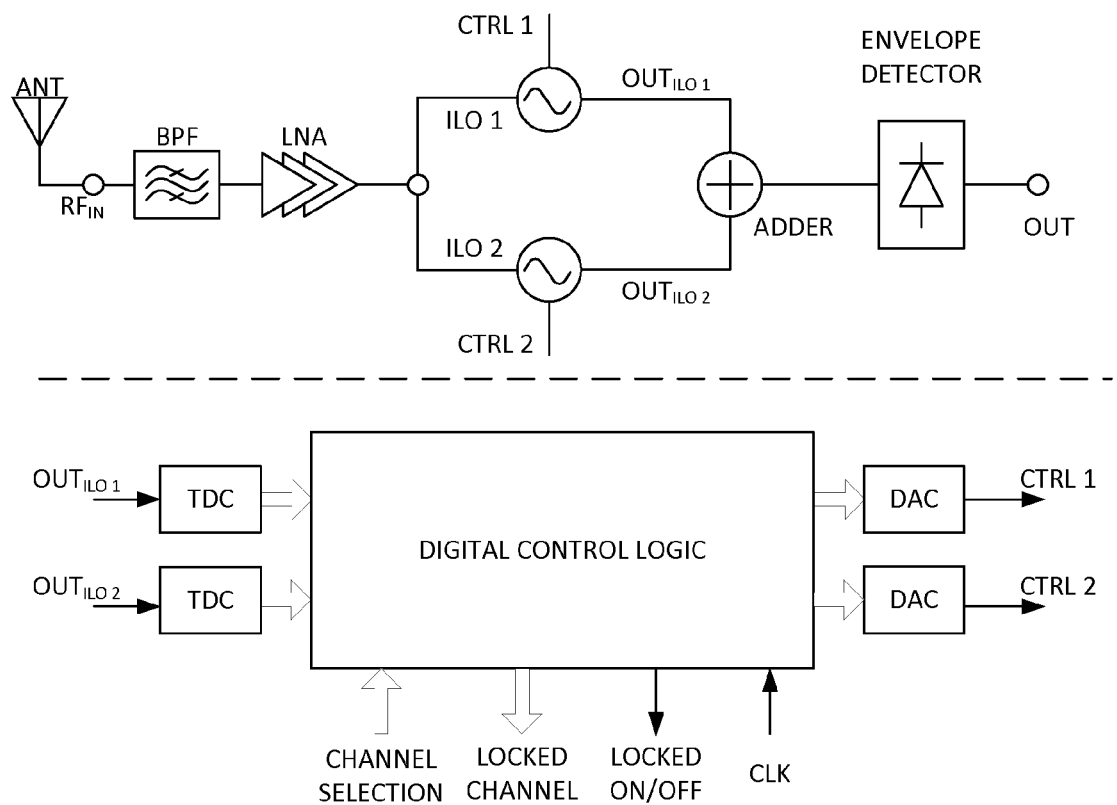
FIGS. 14 and 15 illustrate a circuit block diagram showing one example of a phase-locked loop that may be used according to some embodiments of the present disclosure.
Figure 15:
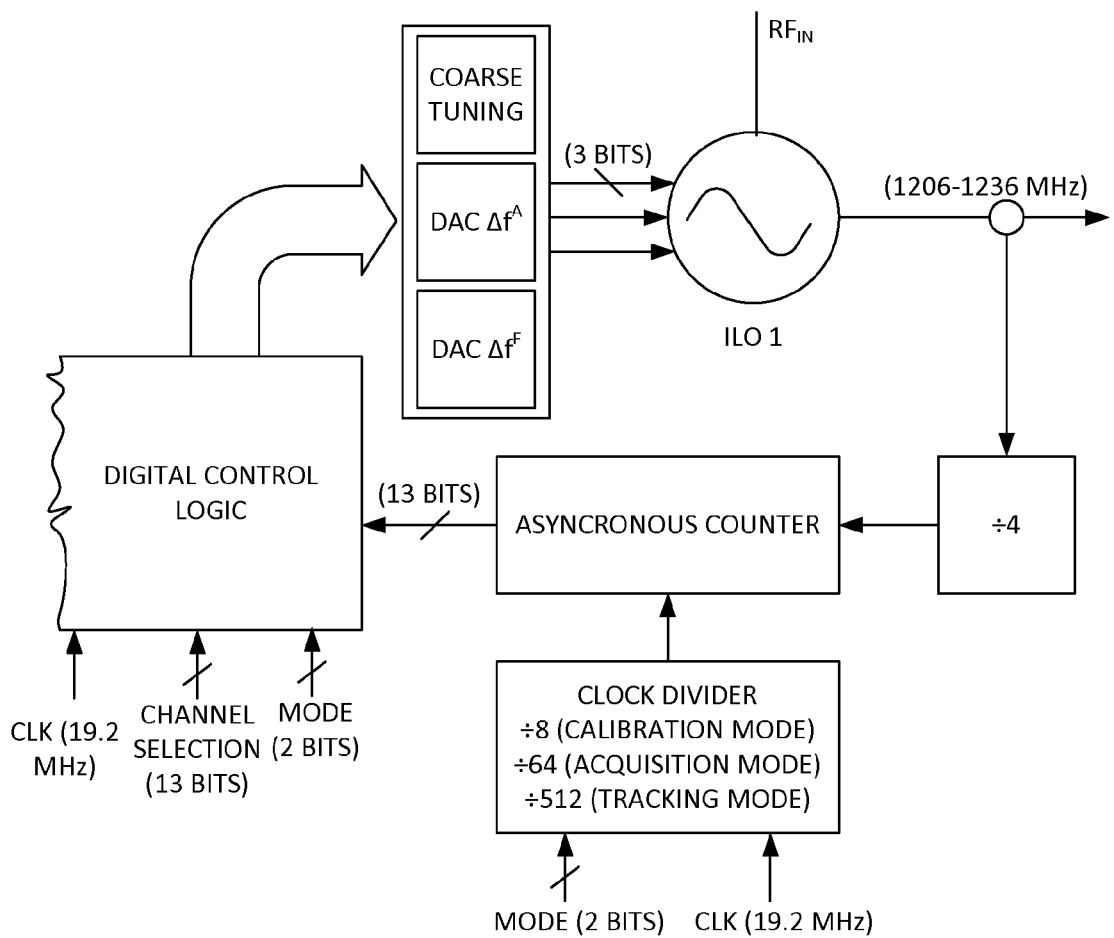

FIGS. 14 and 15 are circuit block diagrams showing all-digital components of a phase-locked loop that may be used according to some embodiments of the present disclosure. With reference to FIG. 14, the antenna (ANT) provides a radio frequency input ($RF_{IN}$) to a bandpass filter (BPF), which is connected to a low noise amplifier (LNA). The output of the LNA is provided to injection locking oscillators ILO 1 and ILO 2. ILO 1 and ILO 2 have control inputs CTRL 1 and CTRL 2, respectively, provided by the digital control logic (DIGITAL CONTROL LOGIC) via the digital to analog converters (DACs). The ILO outputs $OUT_{ILO\ 1}$ and $OUT_{ILO\ 2}$ are connected to an adder (ADDER), and are also connected to time to digital converter (TDC) devices that are connected to the digital control logic. The output of the adder is connected to an envelope detector (ENVELOPE DETECTOR). The digital control logic also has a channel selection input, a locked channel output a locked ON/OFF output, and a clock (CLK) input. With reference to FIG. 15, the digital control logic provides an output to a block including coarse tuning, DAC $\Delta f^A$, and DAC $\Delta f^F$ which provides inputs to ILO 1 on a 3-bit line and other lines. ILO 1 also has a radio frequency input $RF_{IN}$, and provides an output (1206-1236 MHz). The ILO 1 output is also provided to a divide-by-four block (÷4), whose output is provided to an asynchronous counter (ASYNCRONOUS COUNTER). The asynchronous counter also receives an input from a clock divider (CLOCK DIVIDER) that includes a ÷8 calibration mode, ÷64 acquisition mode and a ÷512 tracking mode, and also includes a mode input (2 bits) and a CLK input (19.2 MHz). The asynchronous counter provides a 13-bit output to the digital control logic. The digital control logic also has a CLK input (19.2 MHz), a channel selection input (13 bits) and a mode input (2 bits).

According to some embodiments, one or more of the receiver architectures and the transceiver architectures described herein may be implemented on an integrated circuit using semiconductor processes as known in the art for creating components and circuits of the receiver architectures and transceiver architectures. It should be recognized that a number of variations of the above-identified embodiments will be obvious to one of ordinary skill in the art in view of the foregoing description and teaching. Accordingly, the invention is not to be limited by those specific embodiments, illustrated examples, and methods of the present disclosure shown and described herein. Rather, the scope of the invention is to be defined by the following claims and their equivalents.

What is claimed is:

1. An apparatus comprising:
a low noise amplifier (LNA) configured to receive a modulated carrier signal containing data symbols;
a control circuit having a channel select input, the control circuit configured to generate a first injection-lock control signal in response to the channel select input for controlling a first injection lock resonance frequency and to generate a second injection-lock control signal in response to the channel select input for controlling a second injection lock resonance frequency;
a first injection lock oscillator (ILO) connected to the control circuit and configured to receive the first injection-lock control signal and a second injection lock oscillator (ILO) connected to the control circuit and configured to receive the second injection-lock control signal;
a combiner configured to recover the data symbols by combining outputs from the first ILO and second ILO.

2. The apparatus of claim 1 wherein the control circuit includes a control signal to turn off the LNA.

3. The apparatus of claim 1 wherein the control circuit includes a finite state machine having a calibration state, a signal acquisition state, and a channel detection state.

4. The apparatus of claim 1 wherein the control circuit is selected from the group consisting of a phase locked loop (PLL) and a frequency locked loop (FLL).

5. The apparatus of claim 1 further comprising an asynchronous counter connected to an output of the first ILO and configured to provide a count to the control circuit.

6. The apparatus of claim 1 wherein the first ILO and the second ILO are tuned to approximately $f_c/2$, where $f_c$ is a frequency of a desired carrier.

7. The apparatus of claim 1 wherein each of the first ILO and second ILO include at least one variable capacitance.

8. The apparatus of claim 1 wherein each of the first ILO and second ILO include at least one variable capacitance whose capacitance is controlled by an analog voltage and at least one variable capacitance whose capacitance is controlled by a digital signal having one or more bits.

9. The apparatus of claim 8 wherein the control circuit further comprises at least one digital-to-analog converter for generating the analog voltage.

10. The apparatus of claim 1 wherein the control circuit is a finite state machine.

11. An method comprising:
turning off a low noise amplifier (LNA) connected to an injection locked oscillator (ILO);
measuring the oscillation frequency of the ILO and responsively adjusting at least one control signal to adjust the oscillation frequency of the ILO to be within Δf of fc/2 where fc is a desired carrier frequency and Δf is a frequency offset;
turning on the LNA and applying a modulated signal to the ILO; and,
processing an output of the ILO to obtain tuning figured to receive a modulated carrier signal containing data symbols.

12. The method of claim 11 wherein the LNA is turned off using a control signal from a control circuit.

13. The method of claim 11 wherein the control circuit executes a calibration state, a signal acquisition state, and a channel detection state.

14. The method of claim 11 wherein measuring the oscillation frequency of the ILO is performed using one of a phase locked loop (PLL) or a frequency locked loop (FLL).

15. The method of claim 11 wherein measuring the oscillation frequency of the ILO is performed by counting oscillations and providing a count to the control circuit.

16. The method of claim 11 wherein processing an output of the ILO is performed with a signal combiner.

17. The method of claim 11 wherein the ILO includes at least one variable capacitance.

18. The method of claim 11 wherein responsively adjusting at least one control signal to adjust the oscillation frequency of the ILO comprises adjusting at least one variable capacitance with an analog voltage and adjusting at least one variable capacitance with a digital signal having one or more bits.

19. The method of claim 18 further comprising generating the analog voltage with a digital-to-analog converter.

20. The method of claim 11 further comprising receiving a channel select signal indicating the desired carrier frequency.

* * * * *